(12) United States Patent
Kitamura et al.

(10) Patent No.: US 7,038,995 B2
(45) Date of Patent: May 2, 2006

(54) OPTICAL PICKUP FOR OPTICALLY READING/WRITING DATA INCLUDING CONVERGENT AND ABERRATION CORRECTION OPTICAL SYSTEMS

(75) Inventors: Kazuya Kitamura, Tenri (JP); Yukio Kurata, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 700 days.

(21) Appl. No.: 10/041,068

(22) Filed: Nov. 1, 2001

(65) Prior Publication Data

US 2002/0097504 A1 Jul. 25, 2002

(30) Foreign Application Priority Data

Nov. 2, 2000 (JP) .................................... 2000-336761

(51) Int. Cl.
*G11B 7/00* (2006.01)

(52) U.S. Cl. ............................ 369/112.24; 369/53.12
(58) Field of Classification Search ............. 369/44.23, 369/44.24, 44.32, 53.12, 53.13, 53.14, 53.19, 369/53.42, 112.01, 112.02, 112.23, 112.24, 369/112.25, 112.26
See application file for complete search history.

(56) References Cited

U.S. PATENT DOCUMENTS 5,768,027 A * 6/1998 Takahashi .................. 359/637
5,838,646 A * 11/1998 Watanabe et al. ......... 369/13.53
5,889,748 A * 3/1999 Shimano et al. ........ 369/112.26
6,430,137 B1 * 8/2002 Saimi et al. ............. 369/112.1

FOREIGN PATENT DOCUMENTS

| JP | 06-324281 | 11/1994 |
|---|---|---|
| JP | 07-140381 | 6/1995 |
| JP | 07-151963 | 6/1995 |
| JP | 07-272301 | 10/1995 |
| JP | 09-311271 | 12/1997 |
| JP | 10-104507 | 4/1998 |
| JP | 10-123410 | 5/1998 |
| JP | 10-142494 | 5/1998 |
| JP | 11-025490 | 1/1999 |
| JP | 11-259893 | 9/1999 |
| JP | 2000-090463 | 3/2000 |
| JP | 2000-131508 | 5/2000 |
| JP | 2000-131603 | 5/2000 |
| JP | 2000-182268 | 6/2000 |

* cited by examiner

*Primary Examiner*—Paul W. Huber
(74) *Attorney, Agent, or Firm*—David G. Conlin; William J. Daley, Jr.; Edwards & Angell, LLP

(57) ABSTRACT

A lightweight, highly reliable optical pickup including a singlet objective lens is offered by correcting coma aberrations which adversely affect properties of the objective lens having an increased NA. A convergent optical system is composed of a singlet objective lens with a NA of 0.75 or more and includes an aberration-correcting optical system which corrects coma aberrations due to an inclination or shift of central axes of both surfaces of the objective lens or an inclination of the objective lens or the optical storage medium to an optical axis of the optical pickup.

19 Claims, 22 Drawing Sheets

F I G. 1 6
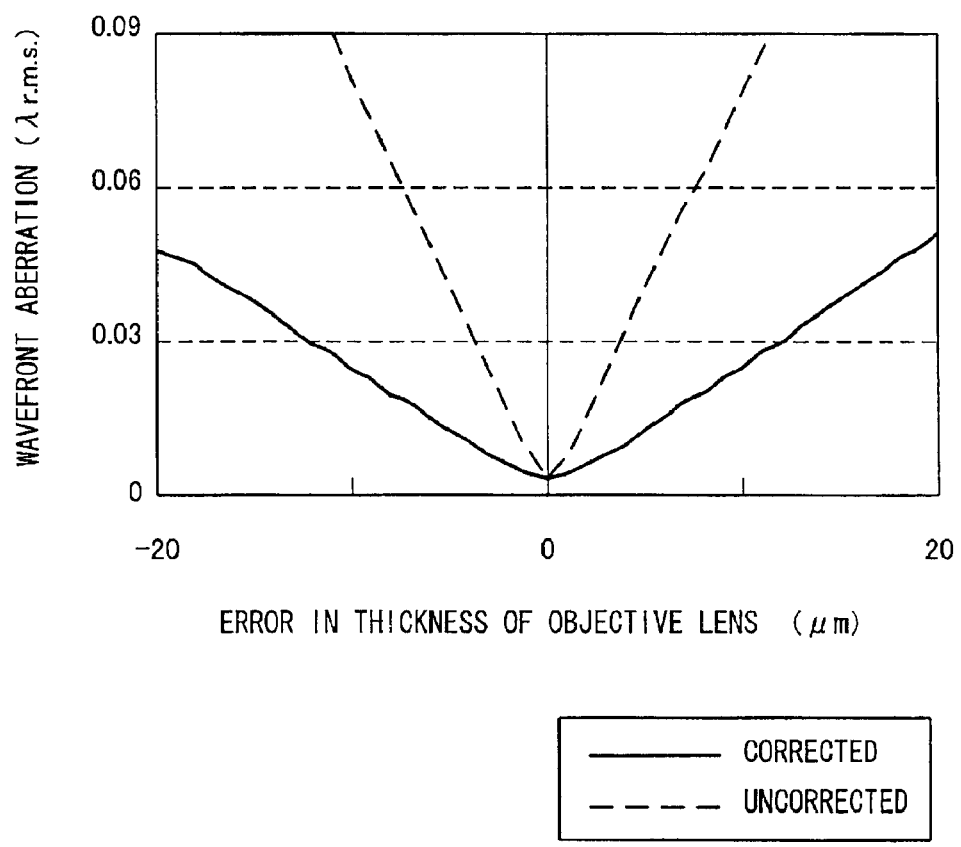

OPTICAL PICKUP FOR OPTICALLY READING/WRITING DATA INCLUDING CONVERGENT AND ABERRATION CORRECTION OPTICAL SYSTEMS

FIELD OF THE INVENTION

The present invention relates to optical pickups for optically reading/writing data on an optical storage medium.

BACKGROUND OF THE INVENTION

Light-based technologies are extensively researched, with some of them already in commercial use, in various fields including communications, measurement, and fabrication to exploit their many advantages in frequency (speed), capability to handle phase and space data processing, etc.

The technology depends on a highly precise objective lens to focus a light beam. The highly precise objective lens is playing an increasingly important role in recent development of bulk storage technology, due to an outstanding demand for light-based, image-capturing apparatus.

To develop an optical bulk data storage technology, or specifically, to develop storage media with an increased recording density, the objective lens needs to be capable of producing a sufficiently focused beam spot on the recording face of a storage medium. As conventionally known, the size of the beam spot produced by an objective lens is directly proportional to the wavelength of light and inversely proportional to the NA (Numerical Aperture) of the objective lens.

As to reduction in light beam wavelength, progress has been made as a result of recent development of blue laser diodes and blue or green SHG lasers.

The NA of the objective lens is also improving. An example is the DVD (Digital Versatile Disc) which boasts an NA of 0.6, in view of the NA of the CD (Compact Disc) as low as 0.45.

Thus, studies are going on to increase the recording density of the storage medium in both aspects: reduction in light beam wavelength and growth in objective lens's NA.

Japanese Unexamined Patent Application No. 10-123410/1998 (Tokukaihei 10-123410; published on May 15, 1998) discloses an optical pickup arranged from two objective lenses, having an NA of 0.85, which are positioned opposite to each other with a predetermined distance therebetween, to achieve a higher density.

Due to the high NA of these two lenses arranged in two separate groups (hereinafter, "double-group lenses"), adjustment needs to be made to compensate for irregularities in thickness of transmissive layers in a storage medium and correct spherical aberrations which occur in the process of multilayer recording. For example, Japanese Unexamined Patent Application No. 10-142494/1998 (Tokukaihei 10-142494; published on May 29, 1998) discloses a technique to correct spherical aberrations by varying the distance between the objective lens. Japanese Unexamined Patent Application No. 2000-131603 (Tokukai 2000-131603; published on May 12, 2000) is another example, disclosing a technique to correct spherical aberrations of an objective lens group 201 composed of lenses 201a, 201b by altering along the optical axis OA the gap between two lenses 202a, 202b constituting an aberration-correcting optical system 202 which is positioned opposite to a storage medium 200 across the objective lens group 201 as shown in FIG. 27.

However, the use of double-group lenses as an objective lens in an optical pickup give rise to following problems.

Double-group lenses are typically housed in a barrel to maintain a predetermined distance between two lens. For example, the double-group lenses disclosed in Japanese Unexamined Patent Application No. 10-123410/1998 introduced above should be positioned elaborately through complex steps when placed in a barrel or similar object to form a single entity. The positioning should be highly precise as to the lens-to-lens distance and the inclination and displacement of the lenses with respect to an optical axis and is conducted by actually transmitting a laser beam through the lenses to observe a focused beam spot and aberrations.

Resin which secures the double-group lenses to the barrel is by no means reliable, because it lacks sufficient resistance to heat and humidity and is likely to deteriorate with time and for other factors.

The optical pickup has a mechanism including a driver, termed actuator, which moves the objective lenses independently in directions both parallel and perpendicular to the optical axis for focusing and tracking purposes. The double-group objective lenses, including the barrel which holds them together, become too heavy to move at high speed, which presents an obstacle in the pursuit of high speed reading and writing.

A possible alternative is the use of a single lens or multiple lenses cemented together with no intervening air space therebetween (hereinafter, collectively called "single-group lens") as an objective lens. The use of these kinds of lenses can address the aforementioned problems caused by the use of double-group lenses as an objective lens as well as provide a means to fabricate a lightweight, highly reliable pickup.

A problem in the use of a single-group objective lens is that the lens is subject to property deterioration due to coma aberration if the NA has a large value. Coma aberration occurs from manufacturing tolerances: errors in surface-to-surface distance, surface precision, surface tilts (inclinations), and a shift (decentration) of the objective lens. Specifically, when the NA is as low as about 0.6, the objective lens is not affected by coma aberration.

Conversely, when the single-group objective lens has a NA as high as that of the foregoing double-group objective lenses (for example, 0.85), the single-group objective lens experiences serious property deterioration due to coma aberrations caused by manufacturing tolerances.

Coma aberration is also caused by inclination of the single-group objective lens to the recording surface of the optical storage medium.

SUMMARY OF THE INVENTION

The present invention has an objective to offer an optical pickup, including a single-group lens as an objective lens, which allows for weight reduction and reliability enhancement even with a high NA by correcting coma aberration affects properties of the objective lens.

To achieve the objective, an optical pickup in accordance with the present invention is an optical pickup for reading/writing data and is characterized in that it includes: a convergent optical system, composed of a singlet objective lens having a NA not less than 0.75, for converging output light emitted by a light source on an optical storage medium; and an aberration-correcting optical system for correcting coma aberrations due to an inclination or shift of central axes of both surfaces of the objective lens or an inclination of the objective lens or the optical storage medium to an optical axis of the optical pickup.

According to the structure, the aberration-correcting optical system corrects those coma aberrations due to an inclination or shift of central axes of both surfaces of the objective lens with a 0.75 or higher NA relative to the storage medium or an inclination of the objective lens or the optical storage medium to an optical axis of the optical pickup; properties deterioration is avoided which is due to coma aberrations of the objective lens.

As a result, the use of an objective lens with a NA of 0.75 or more does not cause coma aberrations that adversely affect properties. The use of this high NA, singlet objective lens in an optical pickup can deliver high resistance to temperature and humidity changes and time-related changes, and thus offers high reliability while achieving high recording density.

Further, no fabrication is required as objective lenses arranged in two separate groups, which readily allows for increased productivity and reduced cost. A small, lightweight, and highly rigid objective lens becomes available, which enables high density, high speed data reading/writing.

The present invention will become more fully understood from the detailed description given hereinbelow and the accompanying drawings which are given by way of illustration only, are not in any way intended to limit the scope of the claims of the present invention.

BRIEF DESCRIPTION OF THE DRAWINGS

FIG. 16 is a graph showing the relationship between the thickness error and an aberration characteristic of an objective lens after correction is made using the aberration-correcting optical system in the optical pickup of FIG. 15.

DESCRIPTION OF THE EMBODIMENTS

[Embodiment 1]

The following will describe an embodiment of the present invention in reference to FIGS. 1–10.

Figure 1:
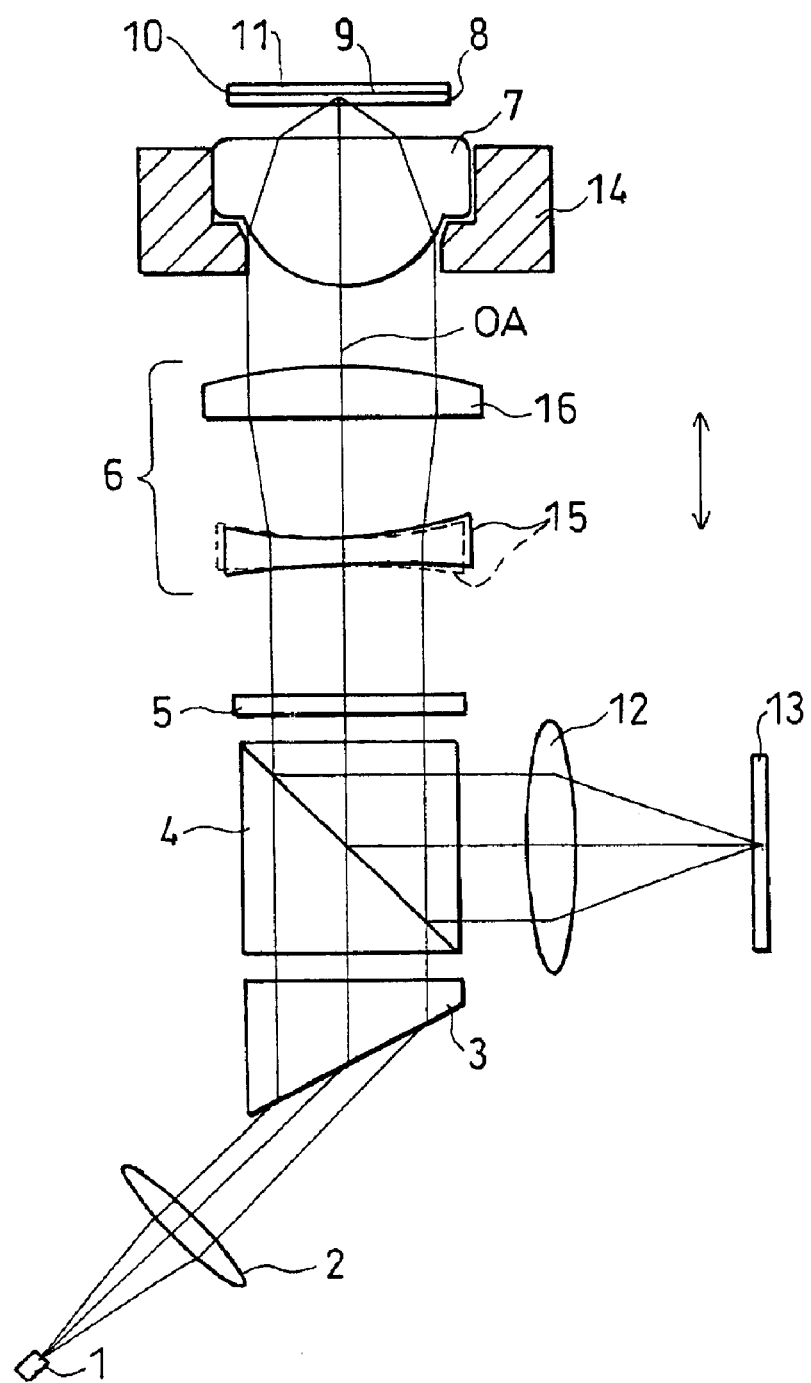
FIG. 1 is a diagram schematically showing an arrangement of an optical pickup in accordance with an embodiment of the present invention.

Referring to FIG. 1, an optical pickup in accordance with the embodiment includes a LD 1 which is a light source, a collimator lens 2, a shape-adjusting prism 3, a polarizing splitter 4, a quarter-wave plate 5, an aberration-correcting optical system 6, an objective lens 7, a converging lens 12, a receiving section 13, and a lens holder 14, to read/write data by converging a light beam on an optical storage medium 10.

Specifically, in the optical pickup thus structured, linearly polarized laser light emitted by the LD 1 which is a light source is collimated by the collimator lens 2 and enters the shape-adjusting prism 3 which converts the intensity distribution of the laser light emitted by the LD 1 from elliptical to semi-circular.

Having the intensity distribution converted to a semi-circular shape by the shape-adjusting prism 3, the laser light is transmitted by the polarizing splitter 4, converted to a circular polarization by the quarter-wave plate 5, before entering the aberration-correcting optical system 6. The laser light is then raised by a 45 degree mirror (not shown), focused by the objective lens 7, transmitted by a transmissive layer 8 constituting the optical storage medium 10 to produce a beam spot on the recording face 9.

Figure 2:
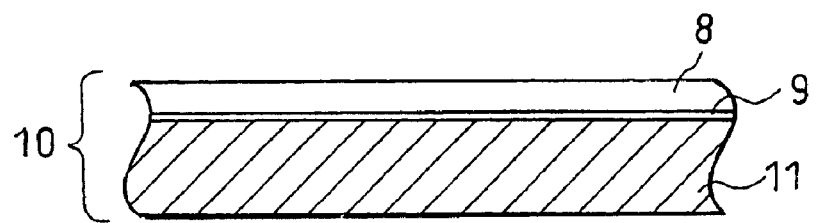
FIG. 2 is a cross-sectional view schematically showing an optical storage medium used in an embodiment of the present invention.

Referring to FIG. 2, the optical storage medium 10 includes the transmissive layer 8, the recording face 9, and a substrate 11. The transmissive layer 8 has a thickness of which the central value is 0.1 mm.

The light reflected (modulated) at the recording face 9 of the optical storage medium 10 travels back the same path shown in FIG. 1. Specifically, the return light is transmitted by the objective lens 7 and the aberration-correcting optical system 6, converted back to a linear polarization by the quarter-wave plate 5, turned by almost 90 degrees by the polarizing splitter 4 (because the polarization direction has been rotated by 90 degrees in the incident and return paths), transmitted by the converging lens 12 to enter the receiving section 13.

As shown in FIG. 1, the objective lens 7 in the optical pickup is secured to the lens holder 14 which is in turn secured by four wires (not shown) to a housing (not shown) which is part of the optical pickup.

Figure 3:
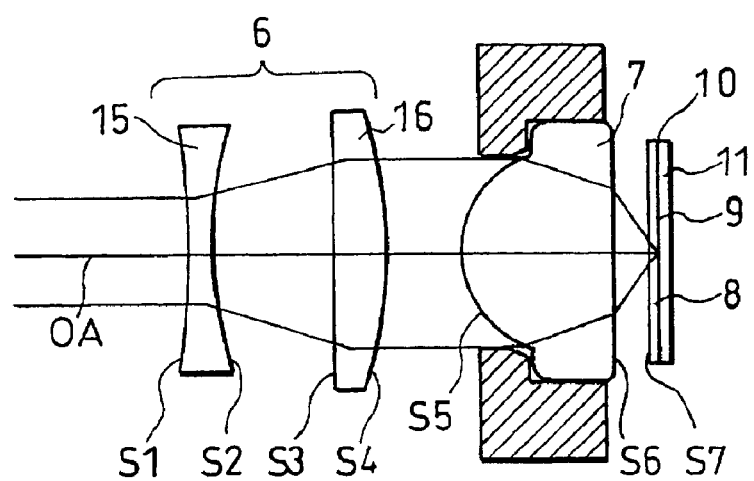
FIG. 3 is a diagram schematically showing an arrangement of an objective lens and an aberration-correcting optical system in the optical pickup of FIG. 1.

Now, referring to FIG. 3, the following will describe an arrangement of the aberration-correcting optical system 6.

The aberration-correcting optical system 6 includes two lenses arranged in two separate groups (double-group lenses), the one closer to the LD designated a first aberration-correcting lens (element) 15, the one closer to the optical storage medium 10 designated a second aberration-correcting lens (element) 16. The first aberration-correcting lens 15 is an aspheric lens with a negative refraction power and the second aberration-correcting lens 16 is an aspheric lens with a positive refraction power: both are made of a single lens. The first aberration-correcting lens 15 and the second aberration-correcting lens 16 are positioned on the optical axis OA of the light emitted by the LD onto the optical storage medium 10.

Table 1 shows the optical structure of the objective lens 7 and the aberration-correcting optical system 6.

The aspheric constants in Table 1 satisfy:

$$Z(1/r)y^2/\{1+(1-(1+K)(1/r)^2y^2)^{1/2}\}+Ay^4+By^6+Cy^8+Dy^{10}+Ey^{12}+Fy^{14}+Gy^{16}+Hy^{18}+Jy^{20}$$

where Z is a depth measured along the optical axis with a vertex of the surface as the reference, y is a height above the optical axis, r is a paraxial curvature radius, K is a conical constant, and A, B, C, D, E, F, G, H, and J are aspheric constants.

Still referring to Table 1, surface numbers S1–S7 represent surfaces of the lenses and a face of the transmissive layer 8 of the optical storage medium 10 facing the objective lens 7, as shown in FIG. 3.

TABLE 1

| | SURFACE NO. | CURVATURE RADIUS (mm) | SURFACE INTERVAL (mm) | INDEX OF REFRACTION OF GLASS | ABBE NUMBER OF GLASS |
|---|---|---|---|---|---|
| FIRST ABERRATION-CORRECTING LENS | S1 | −9.43233<br>K: −6.092373<br>A: 0.164522E−02 B: 0.165341E−02 C: 0.237202E−02<br>D: −0.831718E−03 | 1.0 | nd = 1.51680 | νd = 64.2 |
| | S2 | 4.96737 | 3.98 | | |
| SECOND ABERRATION-CORRECTING LENS | S3<br>S4 | −37.75778<br>−5.07138<br>K: −0.107492<br>A: 0.113991E−03 B: 0.756886E−04 C: 0961254E−06<br>D: 0.453347E−05 | 1.0<br>5.0 | nd = 1.51680 | νd =64.2 |
| FOCUS | STO | infinity | 0 | | |
| OBJECTIVE LENS | S5 | 1.4792<br>K: −0.486800<br>A: 0.368610E−02 B: −0.131835E−03 C: 0.188556E−02<br>D: −0.309584E−02 E: 0.219847E−02 F: −0.588395E−03<br>G: −0.840131E−04 H: 0.434856E−04 J: −0.146533E−05 | 2.3 | nd = 1.81474 | νd = 37.0 |
| | S6 | 28.0979<br>K: 0.000000<br>A: 0.103679E+00 B: −0.190848E+00 C: −0.926785E−01<br>D: 0.287996E+00 E: 0.195929E+00 F: −0.393015E+00<br>G: −0.208769E−03 H: 0.568055E−01 J: −0.117780E−03 | 0.44 | | |
| TRANSMISSIVE LAYER | S7<br>IMAGE | infinity<br>infinity | 0.1 | nd = 1.585 | νd = 29.9 |

The objective lens 7 is designed to receive a parallel luminous flux with a NA of 0.85 (so-called infinite conjugation) and cause substantially no aberrations when the transmissive layer 8 is 0.1 mm thick. The material has an index of refraction of 1.852 for the actually used wavelength of 410 nm.

The objective lens 7 has an effective luminous flux diameter, φ, of 3 and a focal length of 1.763 mm.

Now, the aberration-correcting optical system 6 will be described in terms of arrangement for transmissive layers of different thicknesses.

For example, to write/read data on multilayer storage media with a 0.08 mm, 0.1 mm, and 0.12 mm thick transmissive layer 8, for example, the first aberration-correcting lens 15 and the second aberration-correcting lens 16, when separated by an appropriate distance from each other, can reduce spherical aberrations to lowest levels on the recording face 9. The distance between the center of the first aberration-correcting lens 15 and the center of the second aberration-correcting lens 16 is shown in Table 2 for the foregoing thicknesses of the transmissive layer.

TABLE 2

| THICKNESS OF TRANSMISSIVE LAYER | 0.08 mm | 0.1 mm | 0.12 mm |
|---|---|---|---|
| CENTER-TO-CENTER DISTANCE OF FIRST AND SECOND ABERRATION-CORRECTING LENSES | 4.415 mm | 3.979 mm | 3.611 mm |

Now, the following will describe how to correct aberrations due to manufacturing errors of the objective lens 7.

Manufacturing tolerances of the objective lens 7 are first investigated. Taking precision in the positioning of a die in a molding process, in weight (volume) of the lens material (preform), and in fabrication of the die, etc., into consideration, the lens is likely to vary in thickness by about ±5 μm, in the shifts of both surfaces by about ±5 μm, and in the tilts of both surfaces by about ±2 minutes; these variations are the manufacturing tolerances of the objective lens 7. Accordingly, the optical system should be designed to restrain deterioration of characteristics of the system to a minimum extent so long as errors remain within these ranges.

Meanwhile, an optical pickup can produce a sufficiently focused, good beam if the aberration of a beam spot on the recording face 9 of the optical storage medium 10 is $0.07\lambda$ or less in terms of the r.m.s. value of a wavefront (Marechal Criteria). To restrain aberrations within this tolerable range, tolerable aberrations for each optical component are determined; the objective lens 7 and the aberration-correcting optical system 6 should not cause an aberration exceeding about $0.03\lambda$. The value is treated as the specified limit.

To this end, in the pickup in accordance with the invention, the objective lens 7 is either a single lens or a singlet, and there is included the aberration-correcting optical system 6 composed of lenses (first aberration-correcting lens 15, second aberration-correcting lens 16) either one of which lenses can be tilted and shifted as well as moved along the optical axis OA. A detailed description will follow about the control of the correction of aberration of the objective lens 7 by means of driving the first and second aberration-correcting lenses 15, 16 of the aberration-correcting optical system 6.

First, spherical aberrations caused by errors in thickness of the objective lens 7 are correctable by altering the distance between the first and second aberration-correcting lenses 15, 16 of the aberration-correcting optical system 6, or specifically, by moving either one of the lenses of the aberration-correcting optical system 6 along the optical axis OA.

Figure 4:
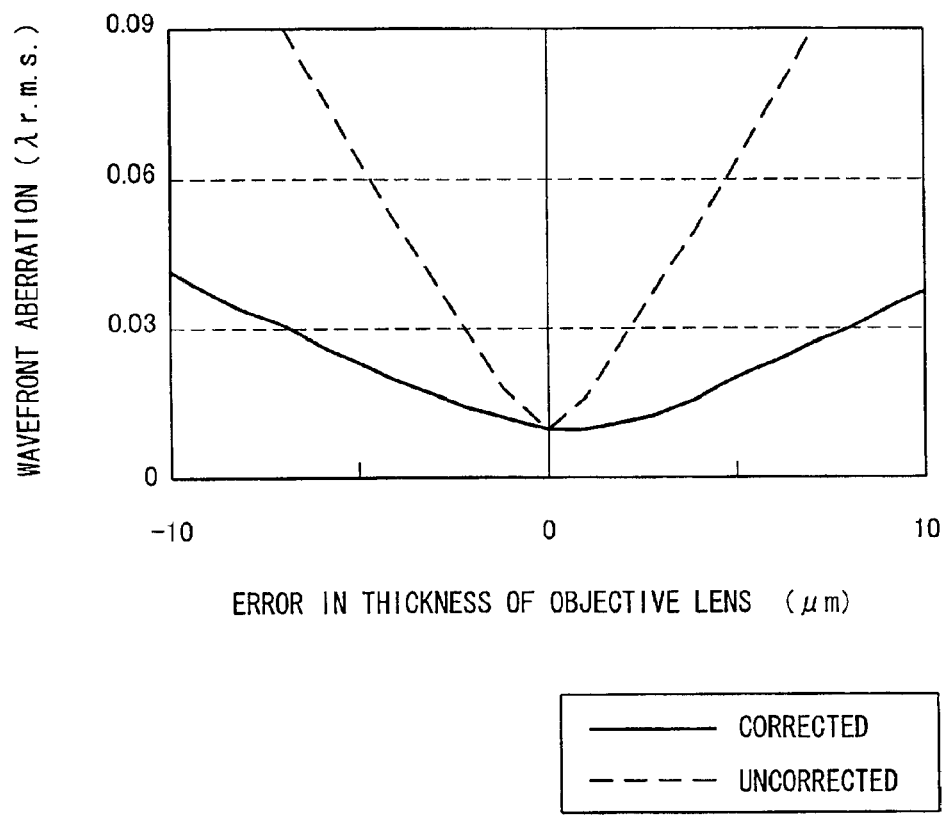
FIG. 4 is a graph showing the relationship between the thickness error and an aberration characteristic of an objective lens after correction is made using the aberration-correcting optical system in the optical pickup of FIG. 1.

FIG. 4 shows raw and corrected aberrations when the thickness of the objective lens 7 contains an error within ±10 μm around the design value. The uncorrected aberration does not involve the aberration-correcting optical system 6, and the corrected aberration is obtainable as a result of altering the center-to-center distance between the first aberration-correcting lens 15 and the second aberration-correcting lens 16. It is presumed that when the objective lens 7 is molded of glass using a die as in the foregoing, the lens varies in thickness about ±5 μm due to die sealing and fabrication errors.

According to the graph in FIG. 4, if no aberration-correcting optical system 6 is used (represented by a broken line in the graph), the aberration falls within the specified limit of $0.03\lambda$ when lens thickness errors are within ±2 μm. It would be therefore understood that precision better than these figures are required in manufacture. Nevertheless, lens thickness errors less than ±2 μm are far from realistic to manufacture when compared to the foregoing manufacturing tolerances of ±5 μm for the objective lens 7.

In contrast, if correction is made by altering the center-to-center distance of the first aberration-correcting lens 15 and the second aberration-correcting lens 16 (represented by a solid line in the graph), lens thickness errors as large as ±7 μm are tolerable. These figures are much more realistic to manufacture than the foregoing manufacturing tolerances of ±5 μm for the objective lens 7.

Next, coma aberrations caused by a surface tilt of the objective lens 7 (inclination of the central axes of the two surfaces of the objective lens) are correctable by shifting or tilting either one of the first aberration-correcting lens 15 and the second aberration-correcting lens 16.

Figure 5:
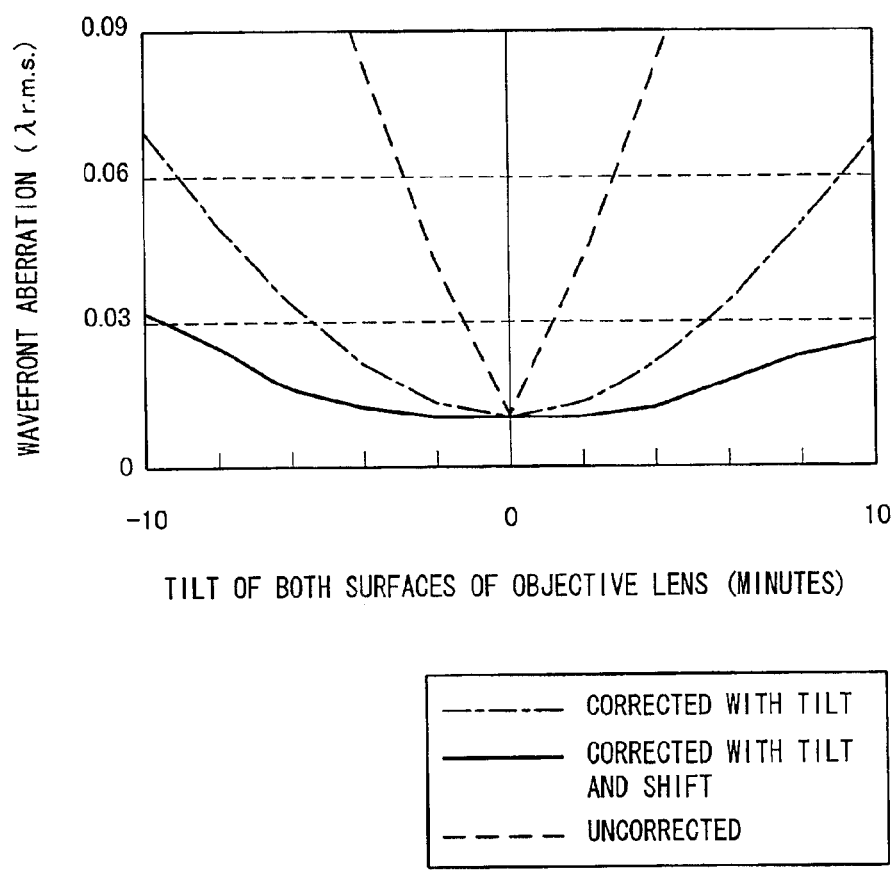
FIG. 5 is a graph showing the relationship between the surface tilt error and an aberration characteristic of an objective lens after correction is made using the aberration-correcting optical system in the optical pickup of FIG. 1.

FIG. 5 shows raw and corrected aberrations when the surface tilt of the objective lens 7 contains an error within ±5 minutes around the design value. The uncorrected aberration does not involve the aberration-correcting optical system 6, and the corrected aberrations are obtainable as results of altering the tilt of the first aberration-correcting lens 15 and both the tilt and shift of the first aberration-correcting lens 15 respectively. It is presumed that when the objective lens 7 is molded of glass using a die as in the foregoing, the surface tilt varies about ±2 minutes due to die sealing and fabrication errors.

According to the graph in FIG. 5, if no aberration-correcting optical system 6 is used (represented by a broken line in the graph), the aberration falls within the specified limit of $0.03\lambda$ when lens surface tilt errors are within ±0.5 minutes. It would be therefore understood that precision better than these figures are required in manufacture. Nevertheless, lens surface tilt errors less than ±0.5 minutes are far from realistic to manufacture when compared to the foregoing manufacturing tolerances of ±2 minutes for the objective lens 7.

In contrast, if correction is made by altering the tilt of the first aberration-correcting lens 15 (represented by an alternate long and short dash line in the graph), lens surface tilt errors as large as ±2.5 minutes are tolerable. These figures are much more realistic to manufacture than the foregoing manufacturing tolerances of ±2 minutes for the objective lens 7. Also, if correction is made by altering both the tilt and shift of the first aberration-correcting lens 15 (represented by a solid line), surface tilt errors of the objective lens 7 as large as ±5 minutes are tolerable. These figures are again much more realistic to manufacture than the foregoing manufacturing tolerances of ±2 minutes for the objective lens 7.

Next, coma aberrations caused by a surface shift of the objective lens 7 (shift of the central axes of the two surfaces of the objective lens) are correctable by shifting and tilting either one of the first aberration-correcting lens 15 and the second aberration-correcting lens 16.

Figure 6:
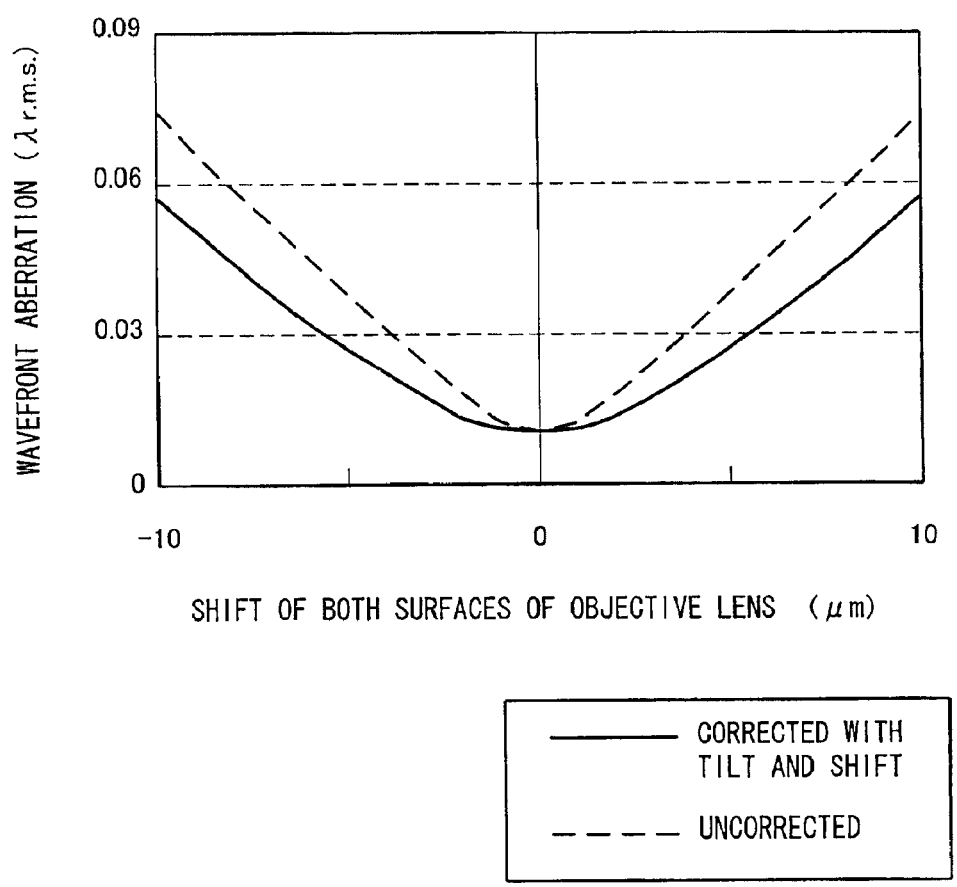
FIG. 6 is a graph showing the relationship between the surface shift error and an aberration characteristic of an objective lens after correction is made using the aberration-correcting optical system in the optical pickup of FIG. 1.

FIG. 6 shows raw and corrected aberrations when the surface shift of the objective lens 7 contains an error within ±10 µm around the design value. The uncorrected aberration does not involve the aberration-correcting optical system 6, and the corrected aberration is obtainable as a result of altering both the tilt and shift of the first aberration-correcting lens 15. It is presumed that when the objective lens 7 is molded of glass using a die as in the foregoing, the surface shift varies about ±5 µm due to die sealing and fabrication errors.

According to the graph in FIG. 6, if no aberration-correcting optical system 6 is used (represented by a broken line), the aberration falls within the specified limit of 0.03λ when lens surface shift errors are within ±4 µm. It would be therefore understood that precision better than these figures are required in manufacture. Nevertheless, lens surface shift errors less than ±4 µm are far from realistic to manufacture when compared to the foregoing manufacturing tolerances of ±5 µm for the objective lens 7.

In contrast, if correction is made by altering both the tilt and shift of the first aberration-correcting lens 15 (represented by a solid line in the graph), lens surface shift errors as large as ±6 µm are tolerable. These figures are much more realistic to manufacture than the foregoing manufacturing tolerances ±5 µm for the objective lens 7.

Alternatively, coma aberrations caused by a surface tilt of the objective lens 7 are correctable by tilting the optical storage medium 10, for example, by tilting the axis of a motor rotating the optical storage medium 10.

Figure 7:
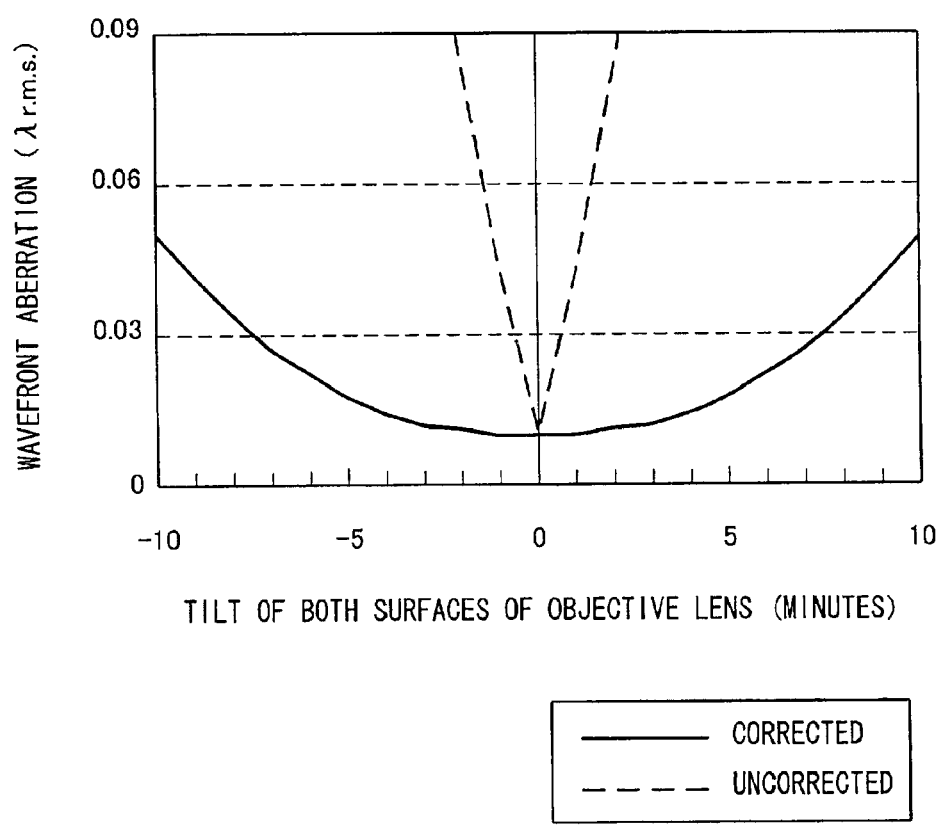
FIG. 7 is a graph showing the relationship between the surface tilt error and an aberration characteristic of an objective lens after correction is made based on the inclination of an optical storage medium in the optical pickup of FIG. 1.

FIG. 7 shows raw and corrected aberrations when the surface tilt of the objective lens 7 contains an error within +10 minutes around the design value. The uncorrected aberration is obtainable when the optical storage medium is not inclined, and the corrected aberration is obtainable as a result of changing the inclination of the optical storage medium. It is presumed that when the objective lens 7 is molded of glass using a die as in the foregoing, the surface tilt varies about ±2 minutes due to die sealing and fabrication errors.

According to the graph in FIG. 7, if the optical storage medium 10 is not inclined (represented by a broken line), the aberration falls within the specified limit of 0.03λ when lens surface tilt errors are within ±0.5 minutes. It would be therefore understood that precision better than these figures are required manufacture. Nevertheless, lens surface tilt errors less than ±0.5 minutes are far from realistic to manufacture when compared to the foregoing manufacturing tolerances of ±2 for the objective lens 7.

In contrast, if correction is made by changing the inclination of the optical storage medium 10 (represented by a solid line in the graph), surface tilt errors as large as ±7.5 minutes are tolerable. These figures are much more realistic to manufacture than the foregoing manufacturing tolerances of ±2 minutes for the objective lens 7.

As detailed above, the present embodiment achieves a NA as high as 0.85 with a singlet objective lens 7 by means of the inclusion of the aberration-correcting optical system 6 which corrects aberrations of the objective lens 7.

The aberration-correcting optical system 6 is adapted to address errors in thickness of the objective lens 7, irregular thicknesses of the transmissive layer 8 of the optical storage medium 10, and multilayer recording, by rendering alterable the distance between the first aberration-correcting lens 15 with a negative refraction power and the second aberration-correcting lens 16 with a positive refraction power.

Further, the aberration-correcting optical system 6 can correct coma aberrations caused by manufacturing errors of the objective lens 7 by shifting or tilting the first aberration-correcting lens 15 or the second aberration-correcting lens 16.

The aberration-correcting optical system 6 is mounted to a driver (see FIG. 8) and calculates the most suitable position of the aberration-correcting optical system 6 and controls accordingly at all times by means of jitter, envelope, or other means to detect an aberration in a reproduction signal. In other words, the aberration-correcting optical system makes it possible to detect coma aberrations caused by an inclination and distortion of the optical storage medium 10, a shift of the objective lens 7 in a direction perpendicular to the track during the tracking of the optical storage medium 10, and other factors and dynamically control the tilt or shift of the aberration-correcting optical system 6 for the most suitable properties.

Figure 8:
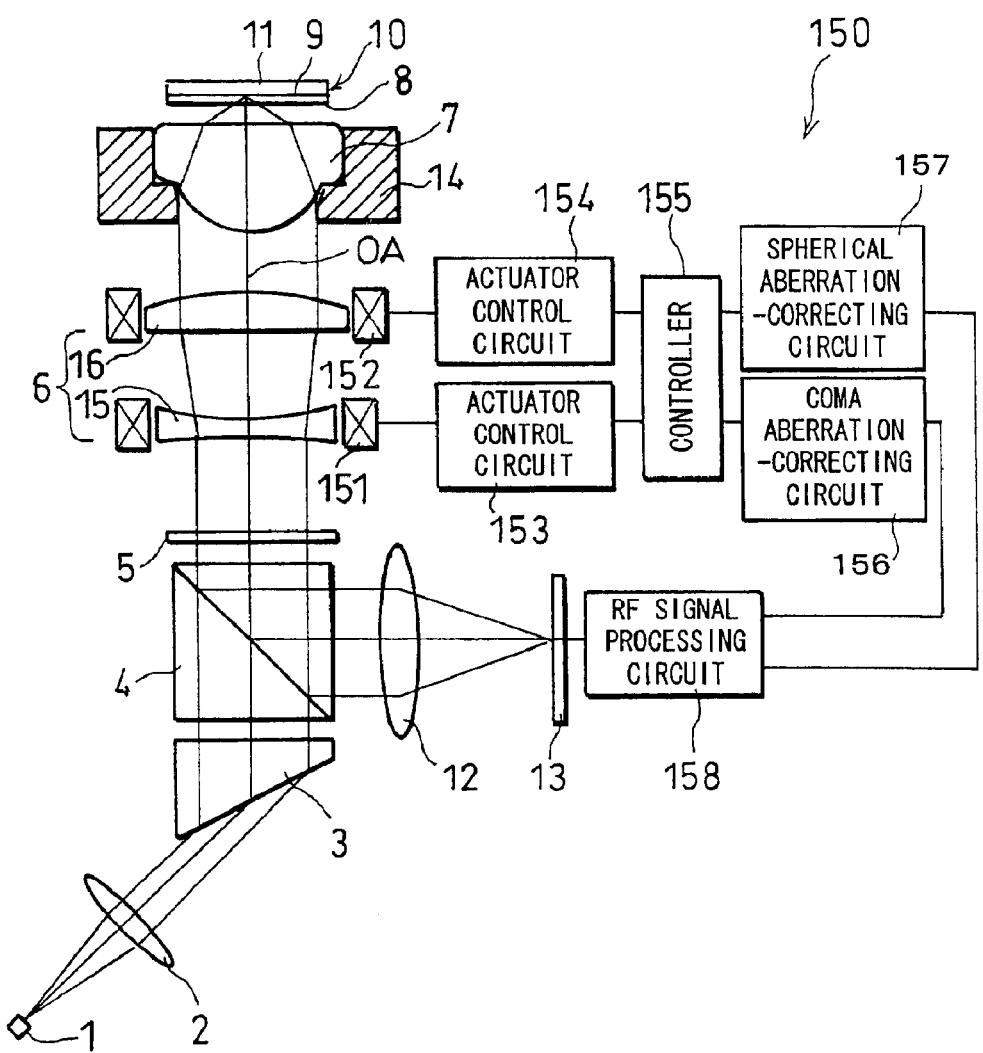
FIG. 8 is an illustration depicting a drive control mechanism for the aberration-correcting optical system in the optical pickup of FIG. 1.

Referring to FIG. 8, a method will be now described of dynamically controlling the aberration-correcting optical system 6, that is, correcting (adjusting) spherical and coma aberrations during a replay of the optical storage medium 10. FIG. 8 shows an optical pickup of the same structure as that of FIG. 1, except that a drive control mechanism 150 is additionally provided for driving the first aberration-correcting lens 15 and the second aberration-correcting lens 16 constituting the aberration-correcting optical system 6.

The drive control mechanism 150 includes an actuator 151 on which the first aberration-correcting lens 15 is mounted and an actuator 152 on which the second aberration-correcting lens 16 is mounted.

The actuator 151 is composed of three VCMs (Voice Coil Motors) distanced by substantially equal intervals along the circumference of the first aberration-correcting lens 15. An arrangement is made to correct the tilt of the first aberration-correcting lens 15 through the control of movable amounts of the three VCMs.

Further, the actuator 152 is adapted to drive the second aberration-correcting lens 16 in a direction parallel to the optical axis OA. These arrangements renders alterable the distance between the first aberration-correcting lens 15 and the second aberration-correcting lens 16.

The actuator 151 is connected to an actuator control circuit 153 which is in turn connected via a controller 155 to a coma aberration-correcting circuit 156. The actuator 152 is connected to an actuator control circuit 154 which is in turn connected via a controller 155 to a spherical aberration-correcting circuit 157.

The coma aberration-correcting circuit 156 and the spherical aberration-correcting circuit 157 are connected to a RF signal processing circuit 158 which is in turn connected to a receiving section 13.

For example, during a replay of the optical storage medium 10, the RF signal processing circuit 158 detects a RF signal in accordance with an optical signal detected by the receiving section 13. The RF signal is separated and fed to the coma aberration-correcting circuit 156 and the spherical aberration-correcting circuit 157. In accordance with the strength of the incoming RF signal, the first aberration-correcting lens 15 and the second aberration-correcting lens 16 are moved to suitable positions to correct the coma aberration and the spherical aberration respectively. Under these conditions, the actuator control circuits 153 and 154 transmits signals to the actuators 151 and 152 in accordance with movements of the first aberration-correcting lens 15 and the second aberration-correcting lens 16. This enables correction of the spherical and coma aberrations even during the detection of the RF signal and thereby produces a good signal.

Figure 9:
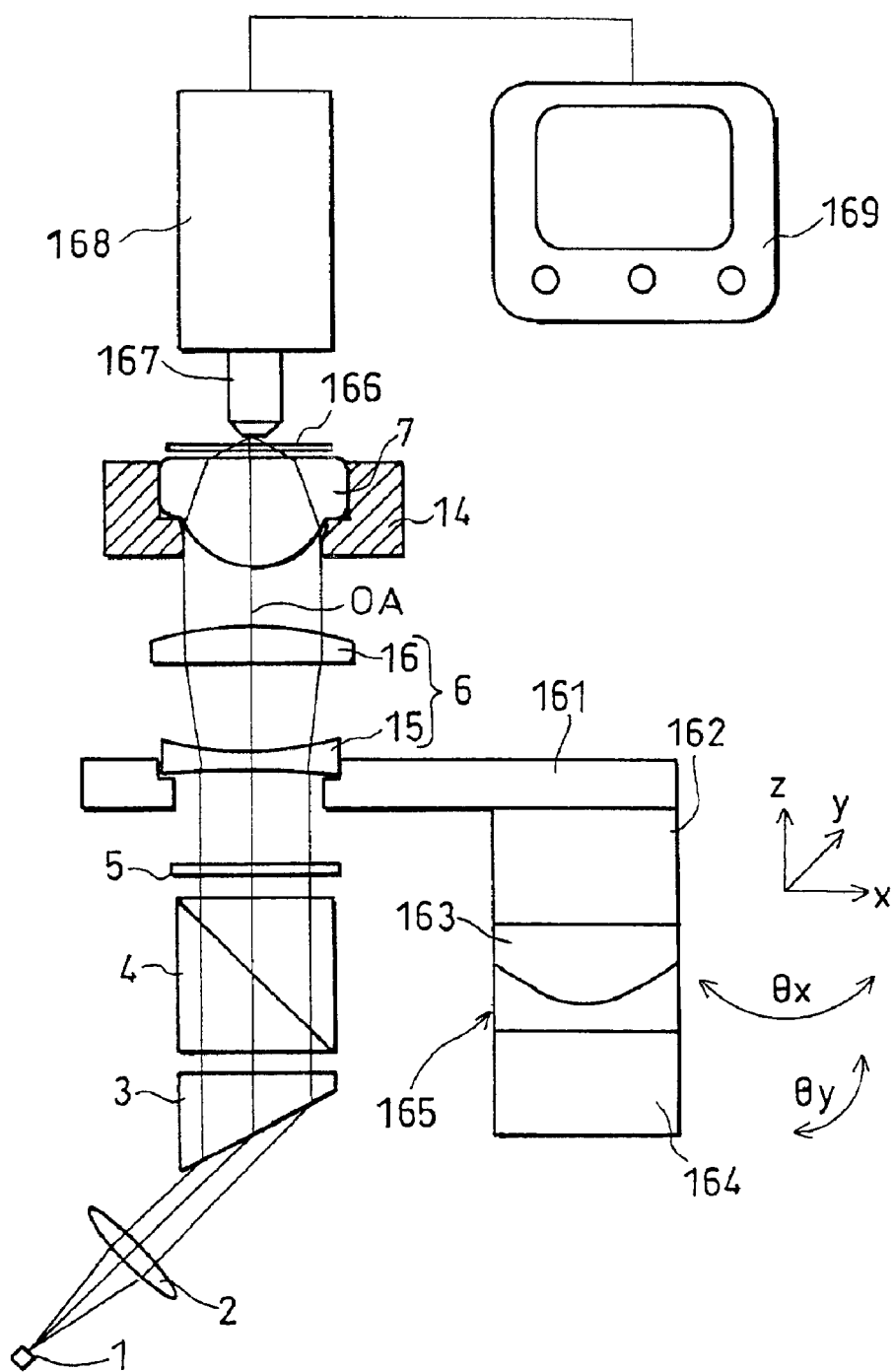
FIG. 9 is an illustration depicting a device to correct coma aberration, which is a part of the aberration-correcting optical system in the optical pickup of FIG. 1.

As to the control of the coma and spherical aberration corrections, dynamic control has been described whereby the coma and spherical aberration corrections are controlled during reading and writing of the optical storage medium 10. Static control is another control whereby the aberration-correcting optical system 6 is adjusted in advance in position upon mounting of the optical pickup and then fixed. When this is the case, it is preferable if the aberration-correcting optical system 6 is adjusted while actually observing/detecting the aberration or the shape of the beam focused by the objective lens 7. The following will describe a specific method to implement the adjustment in reference to FIG. 9. The optical pickup in FIG. 9 is identical to that in FIG. 1, except that the former additionally includes a attitude adjusting device which adjust the attitude of the lens.

A method is now described whereby the first aberration-correcting lens 15 is adjusted using a lens adjusting mechanism to correct spherical and coma aberrations upon mounting an optical pickup to the aberration-correcting optical system 6.

The attitude adjusting device includes a lens holder 161 holding a first aberration-correcting lens 15, an xyz stage 162 fixing the lens holder 161, an integrated lens adjusting stage 165 acting as an θx stage 163 and a θy stage 164, an adjustment dummy transmissive plate 166 provided on a side of the objective lens 7 where laser light leaves, an observation lens 167 allowing for observation of a spot formed by focusing laser light having been transmitted by the adjustment dummy transmissive plate 166, a CCD (Charge Coupled Device) camera 168, and a CRT monitor 169 displaying an image captured by the observation lens 167 and the CCD camera 168. The adjustment dummy transmissive plate 166 is specified to have the same thickness, i.e. 0.1 mm, of the transmissive layer 8 in the optical storage medium 10.

The attitude adjusting device thus arranged can adjust the attitude of the first aberration-correcting lens 15 by the lens holder 161 moving the first aberration-correcting lens 15 in the aberration-correcting optical system 6 linearly along the x-, y-, and z-directions shown in the figure, as well as rotating (tilted) the lens 15 in the θx- and θy directions.

Specifically, referring to FIG. 9, laser light emitted by the LD 1 is transmitted by the collimator lens 2, the shape-adjusting prism 3, the polarizing splitter 4, the quarter-wave plate 5, the first aberration-correcting lens 15, the second aberration-correcting lens 16, the objective lens 7, and the adjustment dummy transmissive plate 166 to produce a beam spot on the surface of the observation lens 167. The shape of the beam spot is captured by the CCD camera 168 and shown on the CRT monitor 169. An observer adjusts the attitude of the first aberration-correcting lens 15 while watching the CRT monitor 169.

To adjust the attitude, the observer observes the beam spot produced by the focusing of the objective lens 7 and shown on the CRT monitor 169 with the LD 1 turned on and adjusts the first aberration-correcting lens 15 in the x-, y-, θx-, and θy-directions using the stages 162–164 of the lens adjusting stage 165 so that coma aberration is reduced as much as possible in terms of the size and shape of the spot.

Here, a quick adjustment is possible if the tilt and shift of the first aberration-correcting lens 15 and the distance between the first aberration-correcting lens 15 and the second aberration-correcting lens 16 are predicted in advance which are most suitable to correct the residual coma aberration and the spherical aberration of the objective lens 7.

Alternatively, in stead of observing the shape of the beam spot, the wavefront aberration of the beam spot may be observed directly using a Mach-Zehnder interferometer, for example.

Figure 10:
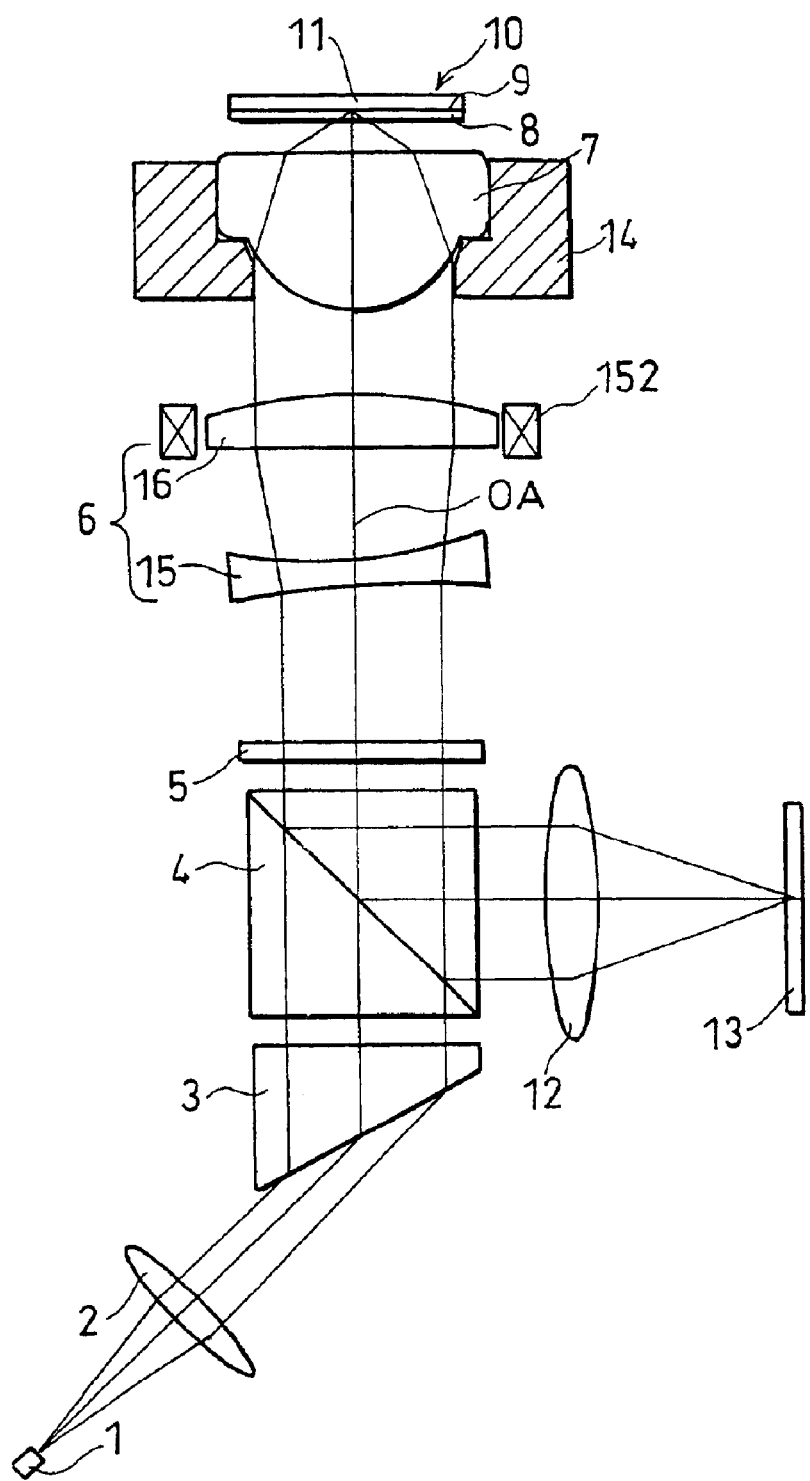
FIG. 10 is a diagram schematically showing an arrangement of the optical pickup with the coma aberration corrected by the device in FIG. 9.

By adjusting the attitude of the first aberration-correcting lens 15 of the aberration-correcting optical system 6 in the x-, y-, θx-, and θy-directions to remove coma aberration in advance when the aberration-correcting optical system 6 is mounted to the optical pickup in the foregoing manner, as shown in FIG. 10, the actuator 151 in FIG. 8 becomes no longer necessary which tilts or shifts the first aberration-correcting lens 15.

In the optical pickup shown in FIG. 10, upon reading/writing data, coma aberration is removed in advance when the aberration-correcting optical system 6 is mounted; therefore, the first aberration-correcting lens 15 is fixed while tilting (inclining) or shifting with respect to the optical axis OA. This makes is possible to remove spherical aberration for data reading/writing, by driving the actuator 152 and thus moving only the second aberration-correcting lens 16 along the optical axis OA.

By adjusting the aberration-correcting optical system 6 using the attitude adjusting device in this manner so that coma aberration is corrected in advance, the actuator 151 and associated control circuitry shown in FIG. 8 which correct coma aberration becomes no longer necessary, making the arrangement of the optical pickup simple.

In the above description, coma aberration is removed by tilting or shifting the first aberration-correcting lens 15 in advance when the aberration-correcting optical system 6 is mounted to the optical pickup. This is a mere example and there are alternatives; the second aberration-correcting lens 16 may be used to remove coma aberration.

FIG. 9 shows only the first aberration-correcting lens 15 is tilted or shifted, that is, the first aberration-correcting lens 15 is driven in the x-, y-, z-, θx-, and θy-directions to correct coma aberration. This is a mere example and there are alternatives; coma aberration may be corrected by driving the second aberration-correcting lens 16 in the x-, y-, and z-directions and the first aberration-correcting lens 15 in the θx- and θy-directions or by, conversely, driving the first aberration-correcting lens 15 in the x-, y-, and z-directions and the second aberration-correcting lens 16 in the θx- and θy-directions.

Further, the actuator used in the aberration-correcting optical system 6 may be used either for the first aberration-correcting lens 15 or the second aberration-correcting lens 16. If the actuator is used in spherical aberration correction which is preceded by coma aberration correction, the actuator 152 may be provided only in the second aberration-correcting lens 16 which is not used in coma aberration correction as shown in FIG. 10. Alternatively, instead of providing the actuator 152 to the second aberration-correcting lens 16, the actuator 151 may be provided only in the first aberration-correcting lens 15 to correct spherical aberration by moving the first aberration-correcting lens 15 having been used in the coma aberration correction along the optical axis OA. These members may also be arranged to work in an opposite manner.

In the present embodiment, the aberration-correcting optical system 6, used as aberration-correcting means, includes a lens (first aberration-correcting lens 15) with a negative refraction power on the side of the LD 1 and a lens (second aberration-correcting lens 16) with a positive refraction power on the side of the optical storage medium 10 to correct aberration; this is for the purpose of reducing the pickup in size. Depending on the arrangement, the optical system may include a lens with a positive refraction power on the side of the LD 1 and a lens with a negative refraction power on the side of the optical storage medium 10 to correct aberration.

As aberration-correcting means, wavefront converting means, such as liquid crystal or a hologram, may be used. The same effects can be obtained by the combined use of wavefront converting means and the aberration-correcting optical system 6. Further, a collimator lens may double as the aberration-correcting optical system 6.

Further, in the present embodiment, an optical system in which the laser light has a wavelength of 410 nm is presented as an example. Other wavelengths may be used. The same effects are available with blue (about 400 nm) and red (650 nm) wavelengths.

Further examples of the optical pickup of the present embodiment are presented below. For convenience of description, the following will describe only those parts related to the objective lens and aberration-correcting optical system; no description is given to the other parts, since they have the same arrangement as in embodiment 1.

EXAMPLE 1

Figure 11:
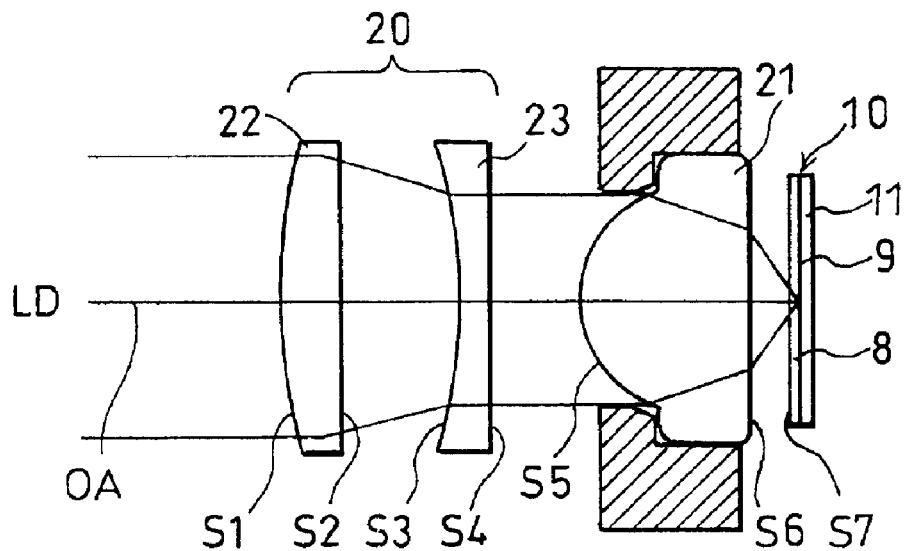
FIG. 11 is a diagram showing an arrangement of an objective lens and an aberration-correcting optical system in an optical pickup in accordance with an example of the embodiment.

The optical pickup of the present example includes an aberration-correcting optical system 20 and an objective lens 21 as shown in FIG. 11.

The aberration-correcting optical system 20 includes two lenses arranged in two separate groups (double-group lenses), the one closer to the LD designated a first aberration-correcting lens (element) 22, the one closer to the optical storage medium designated a second aberration-correcting lens (element) 23. The first aberration-correcting lens 22 is a spherical lens with a negative refraction power and the second aberration-correcting lens 23 is a spherical lens with a positive refraction power; both are made of a single lens. The first aberration-correcting lens 22 and the second aberration-correcting lens 23 are positioned on the optical axis OA of the light emitted by the LD onto the optical storage medium 10.

Table 3 shows the optical structure of the objective lens 21 and the aberration-correcting optical system 20. The aspheric constants are the same as those in Table 1. Further, surface numbers S1–S7 in Table 3 represent surfaces of the lenses and a face of the transmissive layer 8 of the optical storage medium 10 facing the objective lens 21, as shown in FIG. 11.

TABLE 3

| | SURFACE NO. | CURVATURE RADIUS (mm) | SURFACE INTERVAL (mm) | INDEX OF REFRACTION OF GLASS | ABBE NUMBER OF GLASS |
|---|---|---|---|---|---|
| FIRST ABERRATION-CORRECTING LENS | S1<br>S2 | 10.85<br>infinity | 1.42<br>5.365 | nd = 1.51680 | vd = 64.2 |
| SECOND ABERRATION-CORRECTING LENS | S3<br>S4 | −17.39<br>32.65 | 1<br>5 | nd = 1.75520 | vd = 27.5 |
| FOCUS | STO | infinity | 0 | | |
| OBJECTIVE LENS | S5 | 1.4792<br>K: −0.486800<br>A: 0.368610E−02 B: −0.131835E−03 C: 0.188556E−02<br>D: −0.309584E−02 E: 0.219847E−02 F: −0.588395E−03<br>G: −0.840131E−04 H: 0.434856E−04 J: −0.146533E−05 | 2.3 | nd = 1.81474 | vd = 37.0 |
| | S6 | 28.0979<br>K: 0.000000<br>A: 0.103679E+00 B: −0.190848E+00 C: −0.926785E−01<br>D: 0.287996E+00 E: 0.195929E+00 F: −0.393015E+00<br>G: −0.208769E−03 H: 0.568055E−01 J: −0.117780E−03 | 0.44 | | |
| TRANSMISSIVE LAYER | S7<br>IMAGE | infinity<br>infinity | 0.1 | nd = 1.585 | vd = 29.9 |

The objective lens 21 is designed to receive a parallel luminous flux with a NA of 0.85 (so-called infinite conjugation) and cause substantially no aberration when the transmissive layer 8 of the optical storage medium 10 is 0.1 mm thick. The material used for the objective lens 21 has an index of refraction of 1.852 for the actually used wavelength of 410 nm. The objective lens 21 has an effective luminous flux diameter, φ, of 3 and a focal length of 1.763 mm.

The present example includes the aberration-correcting optical system 20 which corrects the aberration of the objective lens 21 to realize the singlet objective lens 21 with a NA no less than 0.85 and addresses errors in thickness of the objective lens 21, irregular thicknesses of the transmissive layer 8 of the optical storage medium 10, and multilayer recording, by rendering alterable the distance between the first aberration-correcting lens 22 with a negative refraction power and the second aberration-correcting lens 23 with a positive refraction power. Further, coma aberrations due to manufacturing errors of the objective lens 21 are correctable by shifting or tilting the first aberration-correcting lens 22 or the second aberration-correcting lens 23 during assembly.

EXAMPLE 2

Figure 12:
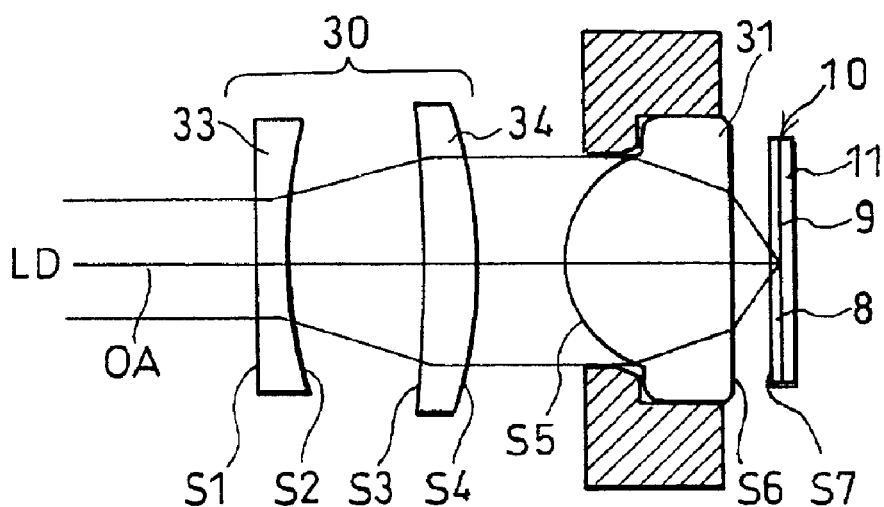
FIG. 12 is a diagram showing an arrangement of an objective lens and an aberration-correcting optical system in an optical pickup in accordance with another example of the embodiment.

The optical pickup of the present example includes an aberration-correcting optical system 30 and an objective lens 31 as shown in FIG. 12.

The aberration-correcting optical system 30 includes two lenses arranged in two separate groups (double-group lenses), the one closer to the LD designated a first aberration-correcting lens (element) 33, the one closer to the optical storage medium designated a second aberration-correcting lens (element) 34. The first aberration-correcting lens 33 is an aspheric lens with a negative refraction power and the second aberration-correcting lens 34 is an aspheric lens with a positive refraction power; both are made of a single lens. A material with a large color dispersion (Abbe constant not more than 40) is used for the first aberration-correcting lens 33. The first aberration-correcting lens 33 and the second aberration-correcting lens 34 are positioned on the optical axis OA of the light emitted by the LD onto the optical storage medium 10.

Table 4 shows the optical structure of the objective lens 31 and the aberration-correcting optical system 30. The aspheric constants are the same as those in Table 1. Further, surface numbers S1–S7 in Table 4 represent surfaces of the lenses and a face of the transmissive layer 8 of the optical storage medium 10 facing the objective lens 31, as shown in FIG. 12.

EXAMPLE 3

Figure 13:
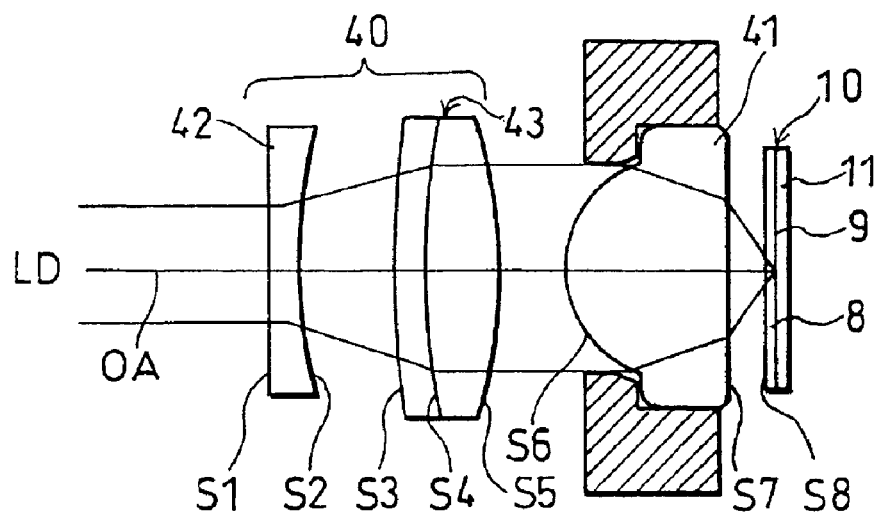
FIG. 13 is a diagram showing an arrangement of an objective lens and an aberration-correcting optical system in an optical pickup in accordance with a further example of the embodiment.

The optical pickup of the present example includes an aberration-correcting optical system 40 and an objective lens 41 as shown in FIG. 13.

Laser light entering the aberration-correcting optical system 40 is transmitted by the objective lens 41 and enters the optical storage medium 10 to produce a beam spot on the recording face 9. The transmissive layer 8 of the optical storage medium 10 is presumed to be 0.1 mm thick.

TABLE 4

|  | SURFACE NO. | CURVATURE RADIUS (mm) | SURFACE INTERVAL (mm) | INDEX OF REFRACTION OF GLASS | ABBE NUMBER OF GLASS |
|---|---|---|---|---|---|
| FIRST ABERRATION- CORRECTING LENS | S1 | −10.97723<br>K: −324.946662<br>A: 0.447672E−01 B: 0.957027E−02 C: 0.113985E−01<br>D: −0.867886E−02 E: 0.180116E−02 | 1 | nd = 1.68893 | vd = 31.2 |
|  | S2 | 4.10804<br>K: 0.000000<br>A: −0.490290E−02 B: 0.404106E−02 C: 0.253524E−01<br>D: 0.104942E−01 E: 0.722690E−02 F: −0.436589E−10<br>G: −0.187935E−10 H: −0.824192E−11 | 5.498 |  |  |
| SECOND ABERRATION- CORRECTING LENS | S3 | −8.28963<br>K: 0.000000<br>A: −0.149581E−03 B: −0.348942E−04 C: 0.323753E−03<br>D: 0.565503E−04 | 1.5 | nd = 1.58913 | vd = 61.3 |
|  | S4 | −3.98941<br>K: −0.439915<br>A: 0.111554E−02 B: 0.338402E−03 C: 0.516269E−04<br>D: −0.497864E−05 E: 0.548935E−04 F: −0.119397E−04 | 5 |  |  |
| FOCUS | STO | infinity | 0 |  |  |
| OBJECTIVE LENS | S5 | 1.4792<br>K: −0.486800<br>A: 0.368610E−02 B: −0.131835E−03 C: 0.188556E−02<br>D: −0.309584E−02 E: 0.219847E−02 F: −0.588395E−03<br>G: −0.840131E−04 H: 0.434856E−04 J: −0.146533E−05 | 2.3 | nd = 1.81474 | vd = 37.0 |
|  | S6 | 28.0979<br>K: 0.000000<br>A: 0.103679E+00 B: −0.190848E+00 C: −0.926785E−01<br>D: 0.287996E+00 E: 0.195929E+00 F: −0.393015E+00<br>G: −0.208769E−03 H: 0.568055E−01 J: −0.117780E−03 | 0.44 |  |  |
| TRANSMISSIVE LAYER | S7<br>IMAGE | infinity<br>infinity | 0.1 | nd = 1.585 | vd = 29.9 |

The objective lens 31 is designed to receive a parallel luminous flux with a NA of 0.85 (so-called infinite conjugation) and cause substantially no aberration when the transmissive layer 8 of the optical storage medium 10 is 0.1 mm thick. The material used for the objective lens 31 has an index of refraction of 1.852 for the actually used wavelength of 410 nm. The objective lens 31 has an effective luminous flux diameter, φ, of 3 and a focal length of 1.763 mm.

The present example includes the aberration-correcting optical system 30 which corrects the aberration of the objective lens 31 to realize the singlet objective lens 31 with a NA no less than 0.85 and addresses errors in thickness of the objective lens 31, irregular thicknesses of the transmissive layer 8 of the optical storage medium 10, and multilayer recording, by rendering alterable the distance between the first aberration-correcting lens 33 with a negative refraction power and the second aberration-correcting lens 34 with a positive refraction power. Further, coma aberrations due to manufacturing errors of the objective lens 31 are correctable by shifting or tilting the first aberration-correcting lens 33 or the second aberration-correcting lens 34 during assembly.

Further, the use of a material with an Abbe constant of 31.2 for the first aberration-correcting lens 33 has achromatic effects and thus reduces color aberration.

The aberration-correcting optical system 40 includes three lenses arranged in two separate groups, the one closer to the LD designated a first aberration-correcting lens (element) 42, the one closer to the optical storage medium designated a second aberration-correcting lens (element) 43. The first aberration-correcting lens 42 is an aspheric lens with a negative refraction power and the second aberration-correcting lens 43 a spherical, achromatic doublet with a positive refraction power. The first aberration-correcting lens 42 and the second aberration-correcting lens 43 are positioned on the optical axis OA of the light emitted by the LD onto the optical storage medium 10.

Table 5 shows the optical structure of the objective lens 41 and the aberration-correcting optical system 40. The aspheric constants are the same as those in Table 1. Further, surface numbers S1–SB in Table 5 represent surfaces of the lenses and a face of the transmissive layer 8 of the optical storage medium 10 facing the objective lens 41, as shown in FIG. 13.

TABLE 5

| SURFACE NO. | CURVATURE RADIUS (mm) | SURFACE INTERVAL (mm) | INDEX OF REFRACTION OF GLASS | ABBE NUMBER OF GLASS |
|---|---|---|---|---|
| FIRST ABERRATION-CORRECTING LENS | S1 | −69.45929 K: −133.362033 A: 0.697609E−02  B: 0.663479E−03  C: −0.666027E−03 D: 0.319109E−03 | 1.0 | nd = 1.51680 | vd = 64.2 |
| | S2 | 3.34632 | 3.49 | | |
| SECOND ABERRATION-CORRECTING LENS | S3 | 23.48087 | 1 | nd = 1.75520 | vd = 27.5 |
| | S4 | 6.70534 | 1.5 | nd = 1.51680 | vd = 64.2 |
| | S5 | −5.37954 | 5 | | |
| FOCUS | STO | infinity | 0 | | |
| OBJECTIVE LENS | S6 | 1.4792 K: −0.486800 A: 0.368610E−02  B: −0.131835E−03  C: 0.188556E−02 D: −0.309584E−02  E: 0.219847E−02  F: −0.588395E−03 G: −0.840131E−04  H: 0.434856E−04  J: −0.146533E−05 | 2.3 | nd = 1.81474 | vd = 37.0 |
| | S7 | 28.0979 K: 0.000000 A: 0.103679E+00  B: −0.190848E+00  C: −0.926785E−01 D: 0.287996E+00  E: 0.195929E+00  F: −0.393015E+00 G: −0.208769E−03  H: 0.568055E−01  J: −0.117780E−03 | 0.44 | | |
| TRANSMISSIVE LAYER | S8 | infinity | 0.1 | nd = 1.585 | vd = 29.9 |
| | IMAGE | infinity | | | |

The objective lens 41 is designed to receive a parallel luminous flux with a NA of 0.85 (so-called infinite conjugation) and cause substantially no aberration when the transmissive layer 8 of the optical storage medium 10 is 0.1 mm thick. The material used for the objective lens 41 has an index of refraction of 1.852 for the actually used wavelength of 410 nm. The objective lens 41 has an effective luminous flux diameter, φ, of 3 and a focal length of 1.7625 mm.

As with embodiment 1, the aberration-correcting optical system 40 can correct spherical aberrations due to the variable thickness of the transmissive layer 8 of the optical storage medium 10 by varying the distance between the first aberration-correcting lens 42 and the second aberration-correcting lens 43 depending on the thickness of the transmissive layer 8.

Spherical aberrations due to errors in thickness and surface precision of the objective lens 41 can also be addressed by varying the distance between the first aberration-correcting lens 42 and the second aberration-correcting lens 43 in the aberration-correcting optical system 40. Coma aberrations due to shifting/tilting errors of the surface of the objective lens 41 can also be addressed by tilting the optical storage medium 10 or shifting or tilting either the first aberration-correcting lens 42 or the second aberration-correcting lens 43 in advance during assembly. These methods of removing aberrations are the same as those in embodiment 1, which allows greater manufacturing tolerances to the objective lens 41.

Further, the use of an achromatic doublet as the second aberration-correcting lens 43 with a positive refraction power allows for reduced color aberration.

EXAMPLE 4

Figure 14:
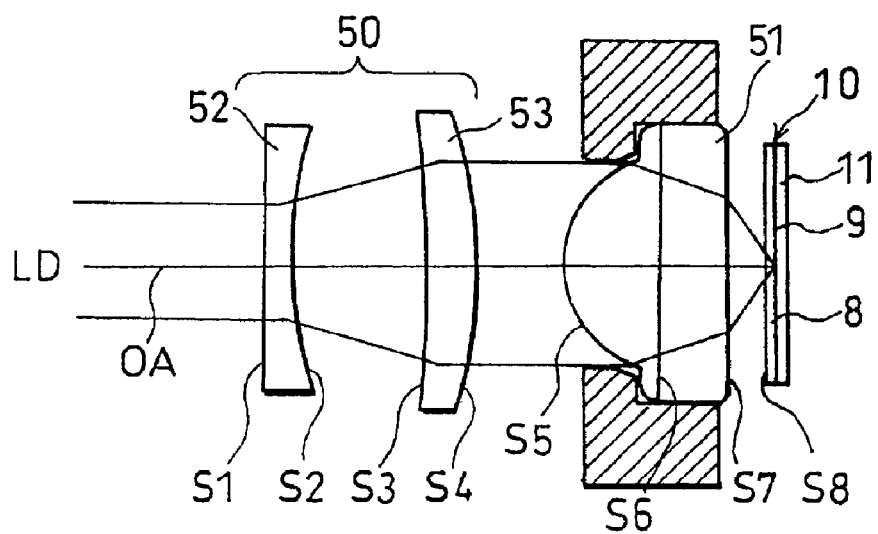
FIG. 14 is a diagram showing an arrangement of an objective lens and an aberration-correcting optical system in an optical pickup in accordance with yet another example of the embodiment.

The optical pickup of the present example includes an aberration-correcting optical system 50 and an objective lens 51 as shown in FIG. 14.

Laser light entering the aberration-correcting optical system 50 is transmitted by the objective lens 51 and enters the optical storage medium 10 to produce a beam spot on the recording face 9. The transmissive layer 8 of the optical storage medium 10 is presumed to be 0.1 mm thick.

The aberration-correcting optical system 50 includes two lenses arranged in two separate groups (double-group lenses), the one closer to the LD designated a first aberration-correcting lens (element) 52, the one closer to the optical storage medium designated a second aberration-correcting lens (element) 53. The first aberration-correcting lens 52 is an aspheric lens with a negative refraction power and the second aberration-correcting lens 53 is an aspheric lens with a positive refraction power; both are made of a single lens. A material with a large color dispersion (i.e., a small Abbe constant) is used for the first aberration-correcting lens 52. The first aberration-correcting lens 52 and the second aberration-correcting lens 53 are positioned on the optical axis OA of the light emitted by the LD onto the optical storage medium 10.

Table 6 shows the optical structure of the objective lens 51 and the aberration-correcting optical system 50. The aspheric constants are the same as those in Table 1. Further, surface numbers S1–S8 in Table 6 represent surfaces of the lenses and a face of the transmissive layer 8 of the optical storage medium 10 facing the objective lens 51, as shown in FIG. 14.

TABLE 6

| SURFACE NO. | CURVATURE RADIUS (mm) | SURFACE INTERVAL (mm) | INDEX OF REFRACTION OF GLASS | ABBE NUMBER OF GLASS |
|---|---|---|---|---|
| FIRST ABERRATION- | S1 | −10.97723 K: −324.946662 | 1 | nd = 1.68893 | vd = 31.2 |

TABLE 6-continued

| | SURFACE NO. | SURFACE CURVATURE RADIUS (mm) | SURFACE INTERVAL (mm) | INDEX OF REFRACTION OF GLASS | ABBE NUMBER OF GLASS |
|---|---|---|---|---|---|
| CORRECTING LENS | S2 | A: 0.447672E-01 B: 0.957027E-02 C: 0.113985E-01<br>D: -0.867886E-02 E: 0.180116E-02<br>4.10804<br>K: 0.000000<br>A: -0.490290E-02 B: 0.404106E-02 C: 0.253524E-01<br>D: 0.104942E-01 E: 0.722690E-02 F: -0.436589E-10<br>G: -0.187935E-10 H: -0.824192E-11 | 5.498 | | |
| SECOND ABERRATION-CORRECTING LENS | S3<br><br><br>S4 | -8.28963<br>K: 0.000000<br>A: -0.149581E-03 B: -0.348942E-04 C: 0.323753E-03<br>D: 0.565503E-04<br>-3.98941<br>K: -0.439915<br>A: 0.111554E-02 B: 0.338402E-03 C: 0.516269E-04<br>D: -0.497864E-05 E: 0.548935E-04 F: -0.119397E-04 | 1.5<br><br><br><br>5 | nd = 1.58913 | vd = 61.3 |
| FOCUS | STO | infinity | 0 | | |
| OBJECTIVE LENS | S5<br><br><br><br>S6<br>S7 | 1.44232<br>K: -0.532727<br>A: 0.378419E-02 B: 0.127353E-02 C: 0.159295E-02<br>D: -0.338359E-02 E: 0.244551E-02 F: -0.645421E-03<br>G: -0.909806E-04 H: 0.420380E-04 J: -0.480973E-07<br>infinity<br>-6.92233<br>K: 0.000000<br>A: 0.267390E+00 B: -0.565493E+00 C: 0.561032E-00<br>D: -0.230571E+00 E: 0.154731E-01 F: 0.119854E-14<br>G: 0.210943E-14 H: 0.662246E-15 | 1.143<br><br><br><br><br>1.199<br>0.47 | nd = 1.74330<br><br><br><br><br>nd = 1.75520 | vd = 49.3<br><br><br><br><br>vd = 27.5 |
| TRANSMISSIVE LAYER | S8<br>IMAGE | infinity<br>infinity | 0.1 | nd = 1.585 | vd = 29.9 |

The objective lens 51 is a doublet designed to receive a parallel luminous flux with a NA of 0.85 (so-called infinite conjugation) and cause substantially no aberration when the transmissive layer 8 of the optical storage medium 10 is 0.1 mm thick. The materials used for the element closer to the LD and that closer to the optical storage medium 10 have an index of refraction of 1.76781 and 1.80304, respectively, for the actually used wavelength of 410 nm. The use of a doublet as the objective lens 51 in this manner restricts color aberrations. The objective lens 51 has an effective luminous flux diameter, φ, of 3 and a focal length of 1.763 mm.

As with embodiment 1, the aberration-correcting optical system 50 can correct spherical aberrations due to the variable thickness of the transmissive layer 8 of the optical storage medium 10 by varying the distance between the first aberration-correcting lens 52 and the second aberration-correcting lens 53 depending on the thickness of the transmissive layer 8.

Spherical aberrations due to errors in thickness and surface precision of the objective lens 51 can also be addressed by varying the distance between the first aberration-correcting lens 52 and the second aberration-correcting lens 53 in the aberration-correcting optical system 50. Coma aberrations due to shifting/tilting errors of the surface of the objective lens 51 can also be addressed by tilting the optical storage medium 10 or shifting or tilting either the first aberration-correcting lens 52 or the second aberration-correcting lens 53 in advance during assembly. These methods of removing aberrations are the same as those in embodiment 1, which allows greater manufacturing tolerances to the objective lens 51.

The present example includes the aberration-correcting optical system 50 which corrects the aberration of the objective lens to realize the singlet objective lens with a NA no less than 0.85 and addresses errors in thickness of the objective lens 51, irregular thicknesses of the transmissive layer 8 of the optical storage medium 10, and multilayer recording, by rendering alterable the distance between the first aberration-correcting lens 52 with a negative refraction power and the second aberration-correcting lens 53 with a positive refraction power. Further, coma aberrations due to manufacturing errors of the objective lens 51 are corrected by shifting or tilting the first aberration-correcting lens 52 or the second aberration-correcting lens 53 during assembly.

Further, the use of a material with an Abbe constant of 31.2 for the first aberration-correcting lens 52 and the use of an achromatic doublet as the objective lens 51 allow for reduced color aberration.

In embodiment 1 and examples 1–4 above, the invention is described for a case that the objective lens has a NA of 0.85. In embodiment 2 below, the invention is described a case that the objective lens has a NA of 0.75.

[Embodiment 2]

The following will describe another embodiment of the present invention. For convenience of description, the embodiment will describe only those parts related to the objective lens and aberration-correcting optical system forming an optical pickup; no description is given to the other parts of the optical pickup, since they have the same arrangement as in embodiment 1.

Figure 15:
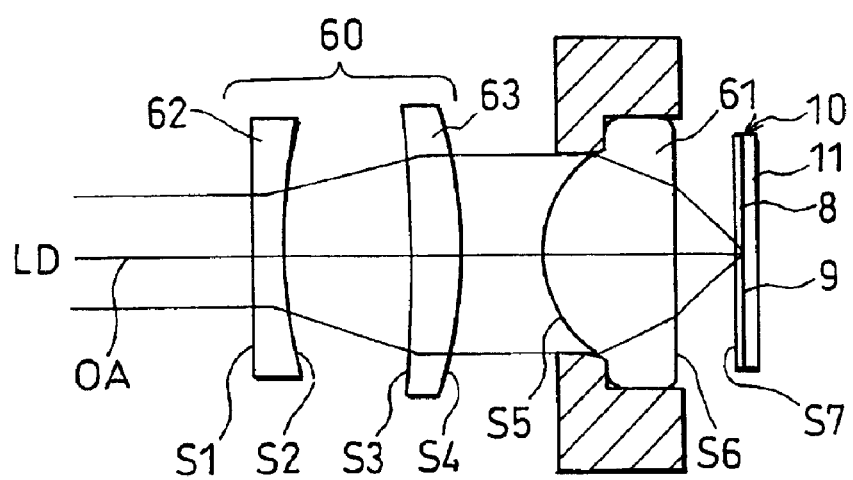
FIG. 15 is a diagram schematically showing an arrangement of an objective lens and an aberration-correcting optical system in an optical pickup in accordance with another embodiment of the present invention.

The optical pickup of the present example includes an aberration-correcting optical system 60 and an objective lens 61 as shown in FIG. 15.

In the optical pickup, laser light entering the aberration-correcting optical system 60 is transmitted by the objective lens 61 and enters the optical storage medium 10 to produce a beam spot on the recording face 9. The transmissive layer 8 of the optical storage medium 10 is presumed to be 0.1 mm thick.

The aberration-correcting optical system 60 includes two lenses arranged in two separate groups (double-group lenses), the one closer to the LD designated a first aberration-correcting lens (element) 62, the one closer to the optical storage medium designated a second aberration-correcting lens (element) 63. The first aberration-correcting lens 62 is an aspheric lens with a negative refraction power and the second aberration-correcting lens 63 is an aspheric lens with a positive refraction power; both are made of a single lens. The first aberration-correcting lens 62 and the second aberration-correcting lens 63 are positioned on the optical axis OA of the light emitted by the LD onto the optical storage medium 10.

Table 7 shows the optical structure of the objective lens 61 and the aberration-correcting optical system 60.

The aspheric constants in Table 7 satisfy:

$$Z=(1/r)y^2/\{1+(1-(1+K)(1/r)^2y^2)^{1/2}\}+Ay^4+By^6+Cy^8+Dy^{10}+Ey^{12}+Fy^{14}+Gy^{16}+Hy^{18}+Jy^{20}$$

where Z is a depth measured along the optical axis with a vertex of the surface as the reference, y is a height above the optical axis, r is a paraxial curvature radius, K is a conical constant, and A, B, C, D, E, F, G, H, and J are aspheric constants.

Still referring to Table 7, surface numbers S1–S7 represent surfaces of the lenses and a face of the transmissive layer 8 of the optical storage medium 10 facing the objective lens 61, as shown in FIG. 15.

Now, the following will describe how to correct aberrations due to manufacturing errors of the objective lens 61. Manufacturing tolerances of the objective lens 61 are first investigated. Taking precision in the positioning of a die in a molding process, in weight (volume) of the lens material (preform), and in fabrication of the die, etc., into consideration, the lens is likely to vary in thickness by about ±5 μm, in the shifts of both surfaces by about ±5 μm, and in the tilts of both surfaces by about ±2 minutes; these variations are the manufacturing tolerances of the objective lens 61. Accordingly, the optical system should be designed to restrain deterioration of characteristics of the system to a minimum extent so long as errors remain within these ranges.

Meanwhile, an optical pickup can produce a sufficiently focused, good beam if the aberration of a beam spot on the recording face 9 of the optical storage medium 10 is 0.07λ or less in terms of the r.m.s. value of a wavefront (Marechal Criteria). To restrain aberrations within this tolerable range, tolerable aberrations for each optical component are determined; the objective lens 61 and the aberration-correcting optical system 60 should not cause an aberration exceeding about 0.03λ. The value is treated as the specified limit.

To this end, in the pickup in accordance with the invention, the objective lens 61 is either a single lens or a singlet, and there is included the aberration-correcting optical system 60 composed of lenses either one of which can be tilted and shifted as well as moved along the optical axis OA.

TABLE 7

| | SURFACE NO. | CURVATURE RADIUS (mm) | SURFACE INTERVAL (mm) | INDEX OF REFRACTION OF GLASS | ABBE NUMBER OF GLASS |
|---|---|---|---|---|---|
| FIRST ABERRATION-CORRECTING LENS | S1 | −9.43233 K: −6.092373 A: 0.164522E−02 B: 0.165341E−02 C: 0.237202E−02 D: −0.831718E−03 | 1 | nd = 1.51680 | vd = 64.2 |
| | S2 | 4.96737 | 3.98 | | |
| SECOND ABERRATION-CORRECTING LENS | S3 | −37.75778 | 1 | nd = 1.51680 | vd = 64.2 |
| | S4 | −5.07138 K: −0.107492 A: 0.113991E−03 B: 0.756886E−04 C: 0.961254E−06 D: 0.453347E−05 | 5 | | |
| FOCUS | STO | infinity | 0 | | |
| OBJECTIVE LENS | S5 | 1.56624 K: −0.521909 A: 0.673002E−02 B: −0.202369E−02 C: 0.311717E−02 D: −0.375929E−02 E: 0.204709E−02 F: −0.648953E−03 G: 0.272102E−04 H: 0.744195E−04 J: −0.207786E−04 | 2 | nd = 1.74330 | vd = 49.3 |
| | S6 | −34.98172 K: 0.000000 A: 0.150690E+00 B: −0.391056E+00 C: 0.523649E+00 D: −0.354349E+00 E: 0.918488E−01 | 0.83 | | |
| TRANSMISSIVE LAYER | S7 | infinity | 0.1 | nd = 1.585 | vd = 29.9 |
| | IMAGE | infinity | | | |

The objective lens 61 is designed to receive a parallel luminous flux with a NA of 0.75 (so-called infinite conjugation) and cause substantially no aberration when the transmissive layer 8 of the optical storage medium 10 is 0.1 mm thick. The material used for the objective lens 61 has an index of refraction of 1.7678 for the actually used wavelength of 410 nm. The objective lens 61 has an effective luminous flux diameter, φ, of 3 and a focal length of 2.0 mm.

As with embodiment 1, the aberration-correcting optical system 60 can correct spherical aberrations due to the variable thickness of the transmissive layer 8 of the optical storage medium 10 by varying the distance between the first aberration-correcting lens 62 and the second aberration-correcting lens 63 depending on the thickness of the transmissive layer 8.

First, spherical aberrations caused by errors in thickness of the objective lens 61 are correctable by altering the distance between the first and second aberration-correcting lenses 62, 63 of the aberration-correcting optical system 60.

FIG. 16 shows raw and corrected aberrations when the thickness of the objective lens 61 contains an error within ±20 μm around the design value. The uncorrected aberration does not involve the aberration-correcting optical system 60, and the corrected aberration is obtainable as a result of altering the center-to-center distance between the first aberration-correcting lens 62 and the second aberration-correcting lens 63. It is presumed that when the objective lens 61 is molded of glass using a die as in the foregoing, the lens varies in thickness about ±5 μm due to die sealing and fabrication errors.

According to the graph in FIG. 16, if no aberration-correcting optical system 60 is used (represented by a broken line in the graph), the aberration falls within the specified limit of 0.03λ when lens thickness errors are within ±3.5 μm. It would be therefore understood that precision better than these figures are required in manufacture. Nevertheless, lens thickness errors less than ±3.5 μm are far from realistic to manufacture when compared to the foregoing manufacturing tolerances of ±5 μm for the objective lens 61.

In contrast, if correction is made by altering the center-to-center distance of the first aberration-correcting lens 62 and the second aberration-correcting lens 63 (represented by a solid line in the graph), lens thickness errors as large as ±12 μm are tolerable. These figures are much more realistic to manufacture than the foregoing manufacturing tolerances of ±5 μm.

Next, coma aberrations caused by a surface tilt of the objective lens 61 (inclination of the central axes of the two surfaces of the objective lens 61) are correctable by shifting or tilting either one of the first aberration-correcting lens 62 and the second aberration-correcting lens 63.

Figure 17:
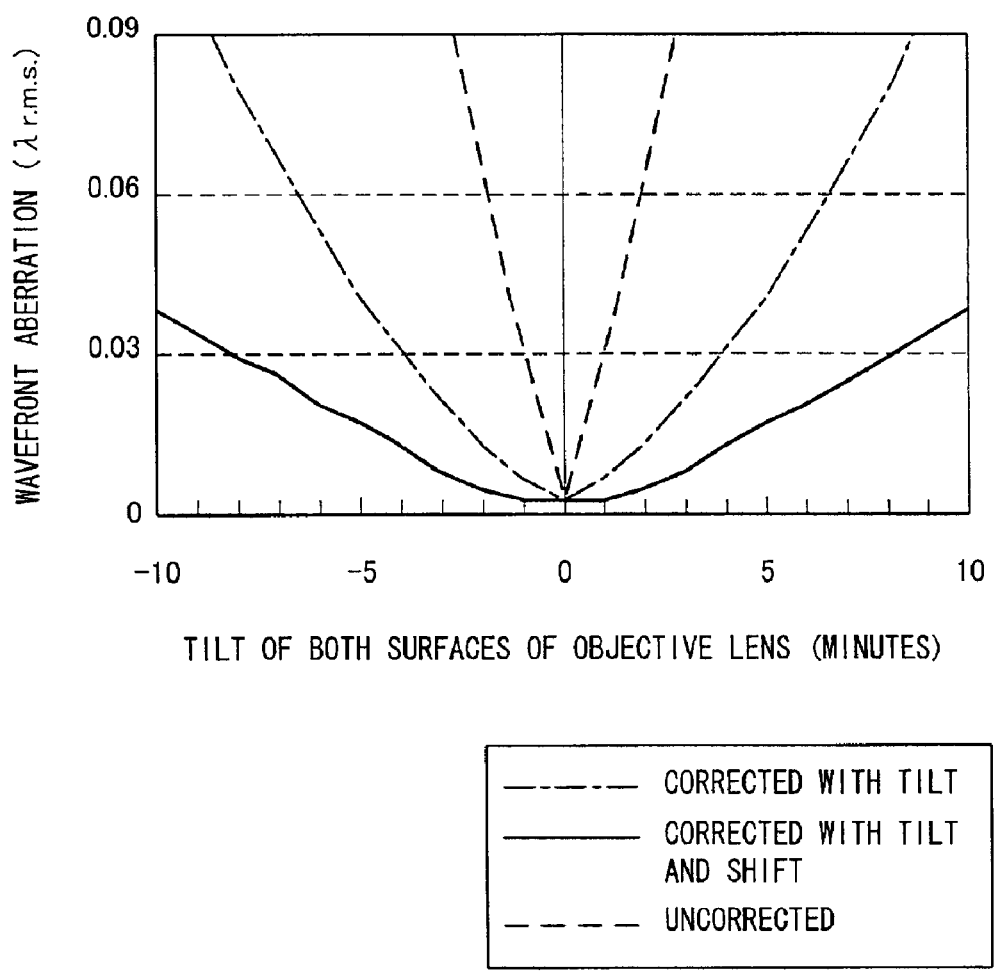
FIG. 17 is a graph showing the relationship between the surface tilt error and an aberration characteristic of an objective lens after correction is made using the aberration-correcting optical system in the optical pickup of FIG. 15.

FIG. 17 shows raw and corrected aberrations when the surface tilt of the objective lens 61 contains an error within ±10 minutes around the design value. The uncorrected aberration does not involve the aberration-correcting optical system 60, and the corrected aberrations are obtainable as results of altering the tilt of the first aberration-correcting lens 62 and both the tilt and shift of the first aberration-correcting lens 62 respectively. It is presumed that when the objective lens 61 is molded of glass using a die as in the foregoing, the surface tilt varies about ±2 minutes due to die sealing and fabrication errors.

According to the graph in FIG. 17, if no aberration-correcting optical system 60 is used (represented by a broken line in the graph), the aberration falls within the specified limit of 0.03λ when lens surface tilt errors are within ±1 minute. It would be therefore understood that precision better than these figures are required in manufacture. Nevertheless, lens surface tilt errors less than ±1 minute are far from realistic to manufacture when compared to the foregoing manufacturing tolerances of ±2 minutes.

In contrast, if correction is made by altering the tilt of the first aberration-correcting lens 62 (represented by an alternate long and short dash line in the graph), lens surface tilt errors as large as ±4 minutes are tolerable. These figures are much more realistic to manufacture than the foregoing manufacturing tolerances of ±2 minutes for the objective lens 61.

Also, if correction is made by altering both the tilt and shift of the first aberration-correcting lens 62 (represented by a solid line), lens surface tilt errors as large as ±8 minutes are tolerable. These figures are again much more realistic to manufacture than the foregoing manufacturing tolerances of ±2 minutes.

Next, coma aberrations caused by a surface shift of the objective lens 61 (shift of the central axes of the two surfaces of the objective lens) are correctable by shifting or tilting either one of the first aberration-correcting lens 62 and the second aberration-correcting lens 63.

Figure 18:
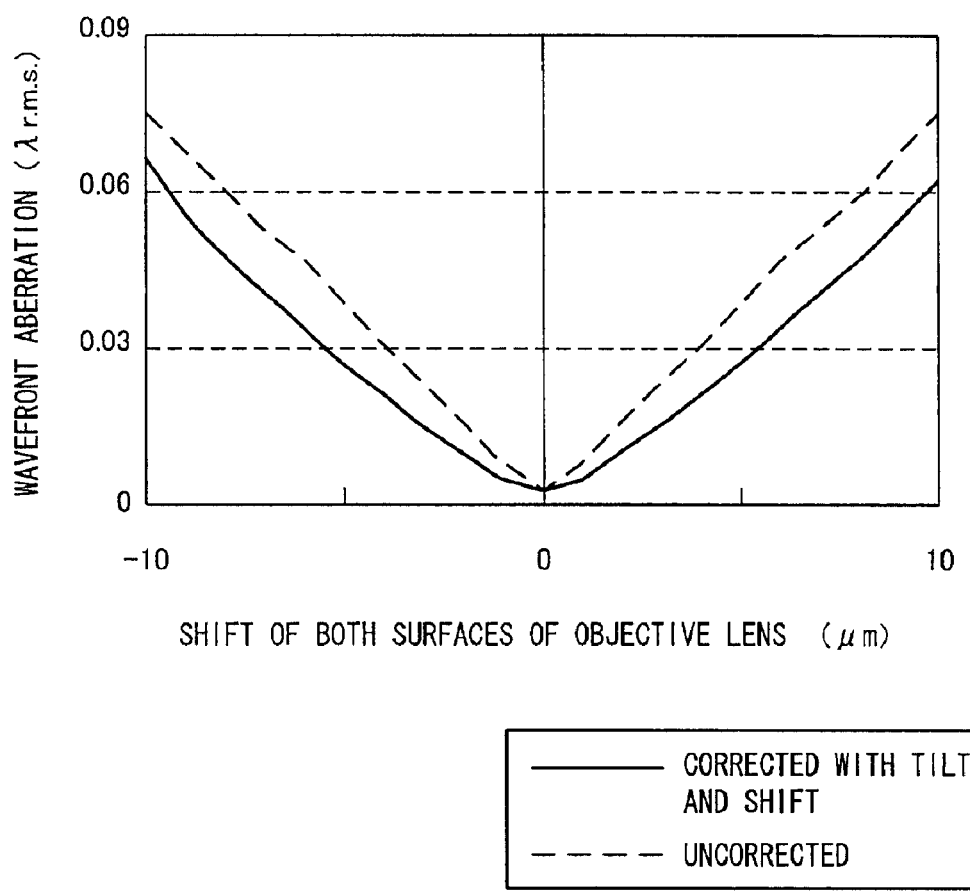
FIG. 18 is a graph showing the relationship between the surface shift error and an aberration characteristic of an objective lens after correction is made using the aberration-correcting optical system in the optical pickup of FIG. 15.

FIG. 18 shows raw and corrected aberrations when the surface shift of the objective lens 61 contains an error within ±10 μm around the design value. The uncorrected aberration does not involve the aberration-correcting optical system 60, and the corrected aberration is obtainable as a result of altering both the tilt and shift of the first aberration-correcting lens 62. It is presumed that when the objective lens 61 is molded of glass using a die as in the foregoing, the shifts of both surfaces of the objective lens 61 (lens surface shift errors) vary about ±5 μm due to die sealing and fabrication errors.

According to the graph in FIG. 18, if no aberration-correcting optical system 60 is used (represented by a broken line), the aberration falls within the specified limit of 0.03λ when lens surface shift errors are within ±4 μm. It would be therefore understood that precision better than these figures are required in manufacture. Nevertheless, lens surface shift errors less than ±4 μm are far from realistic to manufacture when compared to the foregoing manufacturing tolerances of ±5 μm.

In contrast, if correction is made by altering both the tilt and shift of the first aberration-correcting lens 62 (represented by a solid line in the graph), lens surface shift errors as large as ±5.5 μm are tolerable. These figures are much more realistic to manufacture than the foregoing manufacturing tolerances ±5 μm.

Alternatively, coma aberrations caused by a surface tilt of the objective lens 61 are correctable by tilting the optical storage medium 10, for example, by tilting the axis of a motor rotating the optical storage medium 10.

Figure 19:
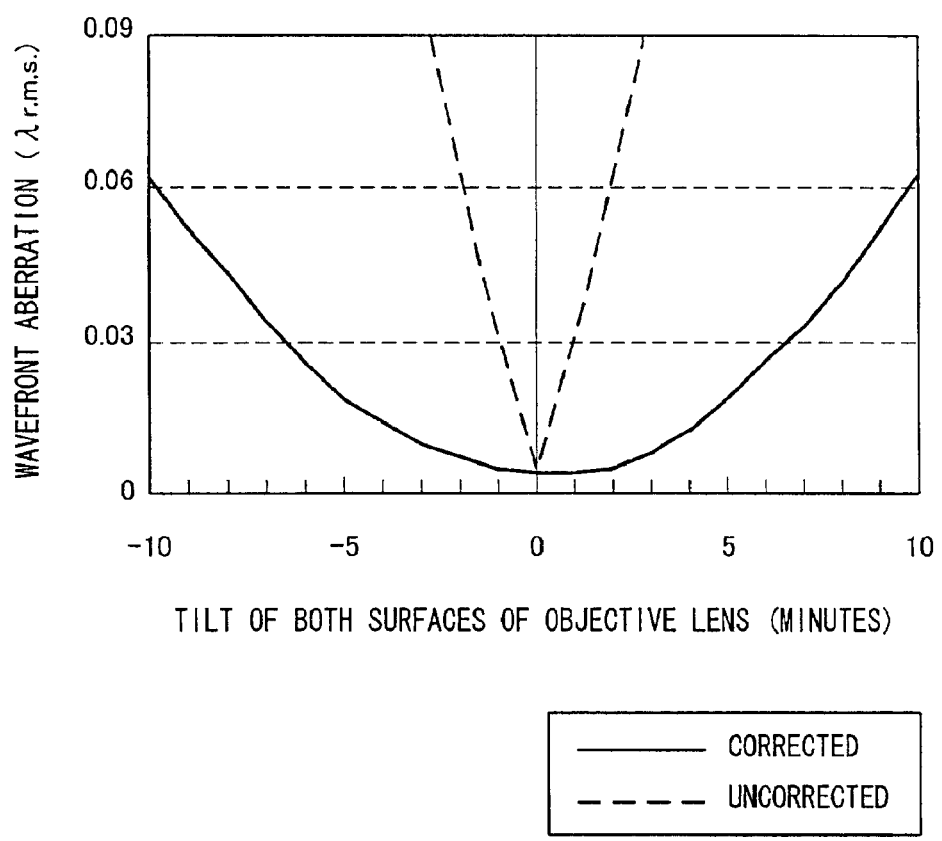
FIG. 19 is a graph showing the relationship between the surface tilt error and an aberration characteristic of an objective lens after correction is made based on the inclination of an optical storage medium in the optical pickup of FIG. 15.

FIG. 19 shows raw and corrected aberrations when the surface tilt of the objective lens 61 contains an error within ±10 minutes around the design value. The uncorrected aberration is obtainable when the optical storage medium is not inclined, and the corrected aberration is obtainable as a result of changing the inclination of the optical storage medium. It is presumed that when the objective lens 61 is molded of glass using a die as in the foregoing, the tilts of both surfaces of the objective lens 61 (lens surface tilt errors) vary about ±2 minutes due to die sealing and fabrication errors.

According to the graph in FIG. 19, if the optical storage medium 10 is not inclined (represented by a broken line), the aberration falls within the specified limit of 0.03λ when lens surface tilt errors are within ±1 minute. It would be therefore understood that precision better than these figures are required manufacture. Nevertheless, lens surface tilt errors less than ±1 minute are far from realistic to manufacture when compared to the foregoing manufacturing tolerances of ±2.

In contrast, if correction is made by changing the inclination of the optical storage medium 10 (represented by a solid line in the graph), lens surface tilt errors as large as ±6.5 minutes are tolerable. These figures are much more realistic to manufacture than the foregoing manufacturing tolerances of ±2 minutes for the objective lens 61.

As detailed above, the present embodiment achieves a NA as high as 0.75 with a singlet objective lens 61 by means of the inclusion of the aberration-correcting optical system 60 which corrects aberrations of the objective lens 61. The aberration-correcting optical system 60 is adapted to address errors in thickness of the objective lens 61, irregular thicknesses of the transmissive layer 8 of the optical storage medium 10, and multilayer recording, by rendering alterable the distance between the first aberration-correcting lens 62 with a negative refraction power and the second aberration-correcting lens 63 with a positive refraction power. Further, the aberration-correcting optical system 60 can correct coma aberrations caused by manufacturing errors of the objective lens 61 by shifting or tilting the first aberration-correcting lens 62 or the second aberration-correcting lens 63.

In embodiments 1 and 2 above, the invention is described for a case when both the first and second aberration-correcting lenses forming the aberration-correcting optical system are aspheric. Alternatively, a diffraction lens may be used in place of either one of the aberration correcting lenses as in embodiment 3 below.

[Embodiment 3]

The following will describe another embodiment of the present invention. For convenience of description, the embodiment will describe only those parts related to the objective lens and aberration-correcting optical system forming an optical pickup; no description is given to the other parts of the optical pickup, since they have the same arrangement as in embodiment 1.

Figure 20:
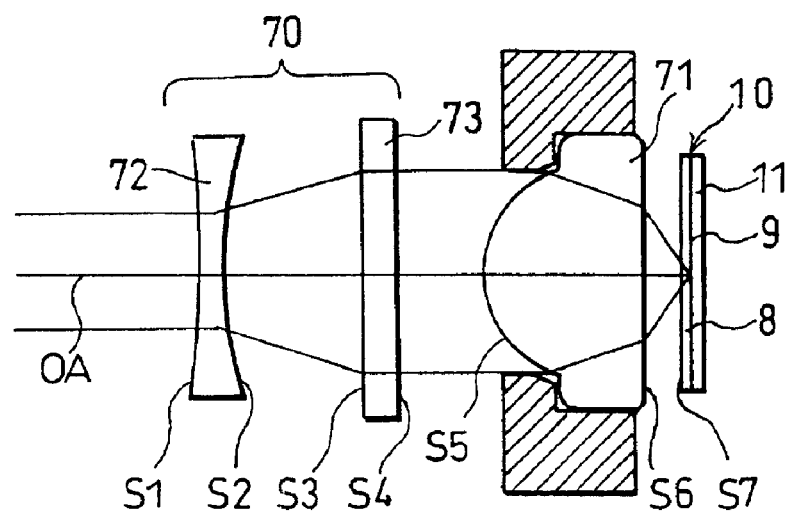
FIG. 20 is a diagram showing an arrangement of an objective lens and an aberration-correcting optical system in an optical pickup in accordance with a further embodiment of the present invention.

The optical pickup of the present example includes an aberration-correcting optical system 70 and an objective lens 71 as shown in FIG. 20.

In the optical pickup, laser light entering the aberration-correcting optical system 70 is transmitted by the objective lens 71 and enters the optical storage medium 10 to produce a beam spot on the recording face 9 of the optical storage medium 10. The transmissive layer 8 of the optical storage medium 10 is presumed to be 0.1 mm thick.

The aberration-correcting optical system 70 includes two lenses arranged in two separate groups (double-group lenses), the one closer to the LD designated an aberration-correcting lens (element) 72, the one closer to the optical storage medium designated an aberration-correcting hologram lens (element) 73. The aberration-correcting lens 72 is an aspheric lens with a negative refraction power and a focal distance of −6 mm, and the aberration-correcting hologram lens 73 is a diffraction lens (hologram lens) with a positive refraction power and a focal distance of 10.4 mm; both are made of a single lens.

Figure 21:
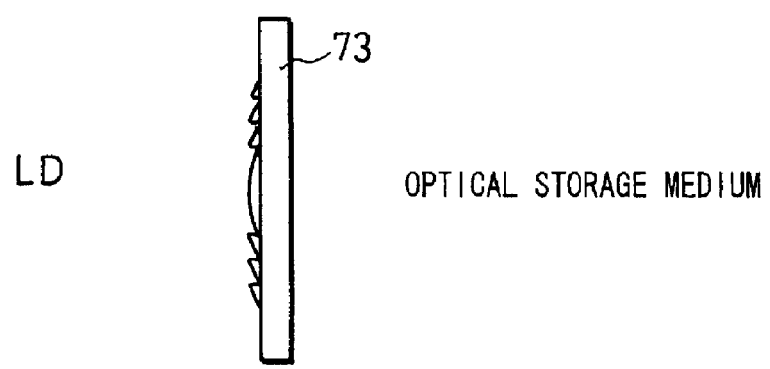
FIG. 21 is a cross-sectional view schematically showing an aberration-correcting hologram lens provided to an aberration-correcting optical system in the optical pickup of FIG. 20.

The aberration-correcting hologram lens 73 has concentric grooves and its cross section forms a blaze as shown in FIG. 21 to improve diffraction efficiency of first order. The aberration-correcting hologram lens 73 has a first ring pitch (cycle) of about 92 μm and an outermost luminous flux pitch (close to circumference) of about 2.6 μm; the overall pitch gradually decreases from the center of the optical axis toward the circumference. The aberration-correcting hologram lens 73 is made by applying an ultraviolet-ray-setting resin on a plane glass substrate with a 2P technique and transferring the coated substrate using a die fabricated using a grounder with a diamond tool. The aberration correcting lens 72 and the aberration-correcting hologram lens 73 are positioned on the optical axis OA of the light emitted by the LD onto the optical storage medium 10.

Table 8 shows the optical structure of the objective lens 71 and the aberration-correcting optical system 70.

The aspheric constants in Table 7 satisfy:

$$Z=(1/r)y^2/\{1+(1-(1+K)(1/r)^2 y^2)^{1/2}\}+Ay^4+By^6+Cy^8+Dy^{10}+Ey^{12}+Fy^{14}+Gy^{16}+Hy^{18}+Jy^{20}$$

where Z is a depth measured along the optical axis with a vertex of the surface as the reference, y is a height above the optical axis, r is a paraxial curvature radius, K is a conical constant, and A, B, C, D, E, F, G, H, and J are aspheric constants.

Still referring to Table 8, surface numbers S1–S7 represent surfaces of the lenses and a face of the transmissive layer 8 of the optical storage medium 10 facing the objective lens 71, as shown in FIG. 20.

TABLE 8

| | SURFACE NO. | CURVATURE RADIUS (mm) | SURFACE INTERVAL (mm) | INDEX OF REFRACTION OF GLASS | ABBE NUMBER OF GLASS |
|---|---|---|---|---|---|
| FIRST ABERRATION-CORRECTING LENS | S1 | −9.43233 K: −6.092373 A: 0.164522E−02 B: 0.165341E−02 C: 0.237202E−02 D: −0.831718E−03 | 1.0 | nd = 1.51680 | vd = 64.2 |
| | S2 | 4.96737 | 4.19 | | |
| SECOND ABERRATION-CORRECTING LENS | S3 | infinity HOLOGRAM LENS | 1.0 | nd = 1.51680 | vd = 64.2 |
| | S4 | infinity | 5.0 | | |
| FOCUS | STO | infinity | 0 | | |
| OBJECTIVE LENS | S5 | 1.4792 K: −0.486800 A: 0.368610E−02 B: −0.131835E−03 C: 0.188556E−02 D: −0.309584E−02 E: 0.219847E−02 F: −0.588395E−03 G: −0.840131E−04 H: 0.434856E−04 J: −0.146533E−05 | 2.3 | nd = 1.81474 | vd = 37.0 |
| | S6 | 28.0979 K: 0.000000 A: 0.103679E+00 B: −0.190848E+00 C: −0.926785E−01 D: 0.287996E+00 E: 0.195929E+00 F: −0.393015E+00 G: −0.208769E−03 H: 0.568055E−01 J: −0.117780E−03 | 0.44 | | |
| TRANSMISSIVE LAYER | S7 | infinity | 0.1 | nd = 1.585 | vd = 29.9 |
| | IMAGE | infinity | | | |

The objective lens 71 is designed to receive a parallel luminous flux with a NA of 0.85 (so-called infinite conjugation) and cause substantially no aberration when the transmissive layer 8 of the optical storage medium 10 is 0.1 mm thick. The material used for the objective lens 71 has an index of refraction of 1.852 for the actually used wavelength of 410 nm. The objective lens 71 has an effective luminous flux diameter, ϕ, of 3 and a focal length of 1.763 mm.

As with embodiment 1, the aberration-correcting optical system 70 can correct spherical aberrations due to the variable thickness of the transmissive layer 8 of the optical storage medium 10 by varying the distance between the aberration-correcting lens 72 and the aberration-correcting lens 73 depending on the thickness of the transmissive layer 8.

Now, the following will describe how to correct due to manufacturing errors of the objective lens 71. Manufacturing tolerances of the objective lens 71 are first investigated.

Taking precision in the positioning of a die in a molding process, in weight (volume) of the lens material (preform), and in fabrication of the die, etc., into consideration, the lens is likely to vary in thickness by about ±5 µm, in the shifts of both surfaces by about ±5 µm, and in the tilts of both surfaces by about ±2 minutes; these variations are the manufacturing tolerances of the objective lens 71. Accordingly, the optical system should be designed to restrain deterioration of characteristics of the system to a minimum extent so long as errors remain within these ranges.

Meanwhile, an optical pickup can produce a sufficiently focused, good beam if the aberration of a beam spot on the recording face 9 of the optical storage medium 10 is 0.07λ or less in terms of the r.m.s. value of a wavefront (Marechal Criteria). To restrain aberrations within this tolerable range, tolerable aberrations for each optical component are determined; the objective lens 71 and the aberration-correcting optical system 70 should not cause an aberration exceeding about 0.03λ. The value is treated as the specified limit.

To this end, in the pickup in accordance with the invention, the objective lens 71 is either a single lens or a singlet, and there is included the aberration-correcting optical system 70 composed of lenses either one of which can be tilted and shifted as well as moved along the optical axis OA.

First, spherical aberrations caused by errors in thickness of the objective lens 71 are correctable by altering the distance between the aberration-correcting lenses 72 and the aberration-correcting hologram lens 73 of the aberration-correcting optical system 70.

Figure 22:
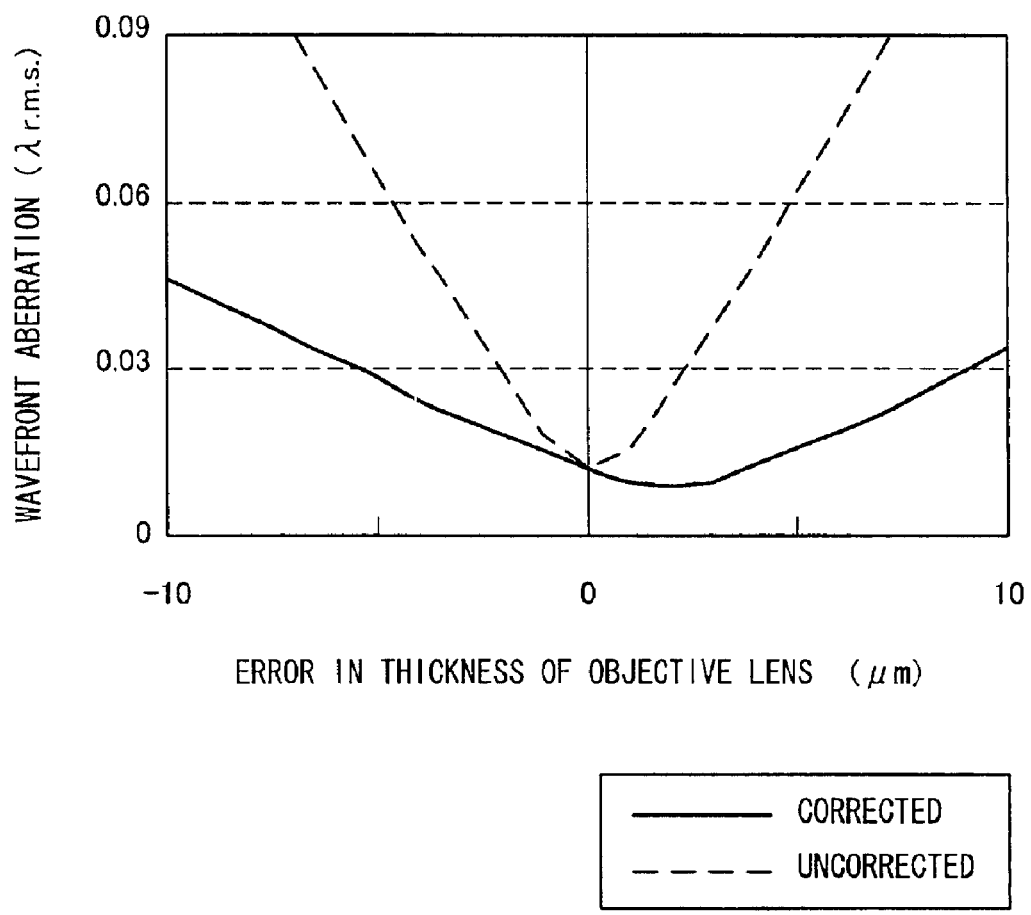
FIG. 22 is a graph showing the relationship between the thickness error and an aberration characteristic of an objective lens after correction is made using the aberration-correcting optical system in the optical pickup of FIG. 20.

FIG. 22 shows raw and corrected aberrations when the thickness of the objective lens 71 contains an error within ±10 µm around the design value. The uncorrected aberration does not involve the aberration-correcting optical system 70, and the corrected aberration is obtainable as a result of altering the center-to-center distance between the aberration-correcting lens 72 and the aberration-correcting hologram lens 73. It is presumed that when the objective lens 71 is molded of glass using a die as in the foregoing, the lens varies in thickness about ±5 µm due to die sealing and fabrication errors.

According to the graph in FIG. 22, if no aberration-correcting optical system 70 is used (represented by a broken line in the graph), the aberration falls within the specified limit of 0.03λ when lens thickness errors are within ±2 µm. It would be therefore understood that precision better than these figures are required in manufacture. Nevertheless, lens thickness errors less than ±2 µm are far from realistic to manufacture when compared to the foregoing manufacturing tolerances of ±5 µm.

In contrast, if correction is made by altering the center-to-center distance of the aberration-correcting lens 72 and the aberration-correcting hologram lens 73 (represented by a solid line in the graph), lens thickness errors as large as −5 µm to +9 µm are tolerable. These figures are much more realistic to manufacture than the foregoing manufacturing tolerances of ±5 µm.

Next, coma aberrations caused by a surface tilt of the objective lens 71 (inclination of the central axes of the two surfaces of the objective lens 71) are correctable by shifting or tilting either one of the aberration correcting lens 72 and the aberration-correcting hologram lens 73.

Figure 23:
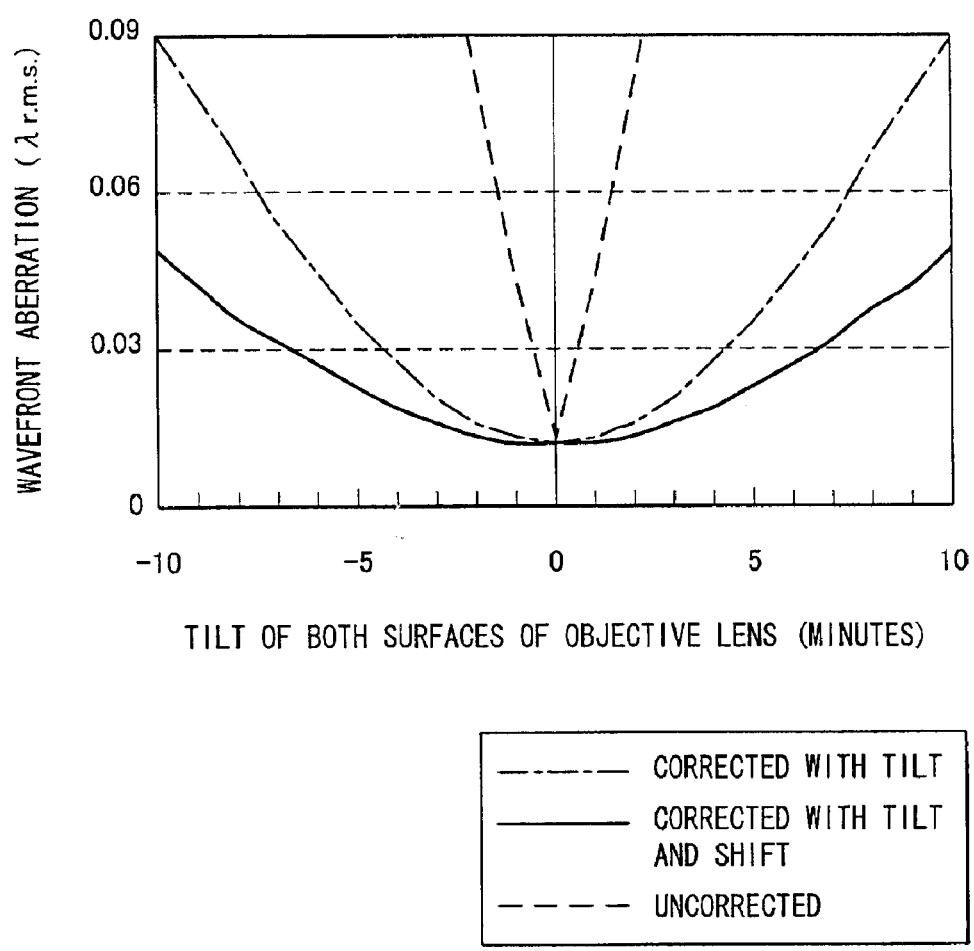
FIG. 23 is a graph showing the relationship between the surface tilt error and an aberration characteristic of an objective lens after correction is made using the aberration-correcting optical system in the optical pickup of FIG. 20.

FIG. 23 shows raw and corrected aberrations when the surface tilt of the objective lens 71 contains an error within ±10 minutes around the design value. The uncorrected aberration does not involve the aberration-correcting optical system 70, and the corrected aberrations are obtainable as results of altering the tilt of the aberration-correcting lens 72 and both the tilt and shift of the aberration-correcting lens 72 respectively. It is presumed that when the objective lens 71 is molded of glass using a die as in the foregoing, the surface tilt varies about ±2 minutes due to die sealing and fabrication errors.

According to the graph in FIG. 23, if no aberration-correcting optical system 70 is used (represented by a broken line in the graph), the aberration falls within the specified limit of 0.03λ when lens surface tilt errors are within ±0.5 minutes. It would be therefore understood that precision better than these figures are required in manufacture. Nevertheless, lens surface tilt errors less than ±0.5 minutes are far from realistic to manufacture when compared to the foregoing manufacturing tolerances of ±2 minutes.

In contrast, if correction is made by altering the tilt of the aberration-correcting lens 72 (represented by an alternate long and short dash line in the graph), lens surface tilt errors as large as ±4.5 minutes are tolerable. These figures are much more realistic to manufacture.

Also, if correction is made by altering both the tilt and shift of the aberration-correcting lens 72 (represented by a solid line), lens surface tilt errors as large as ±6.5 minutes are tolerable. These figures are again much more realistic to manufacture.

Next, coma aberrations caused by a surface shift of the objective lens 71 (shift of the central axes of the two surfaces of the objective lens) are correctable by shifting or tilting either one of the aberration-correcting lens 72 and the aberration-correcting hologram lens 73.

Figure 24:
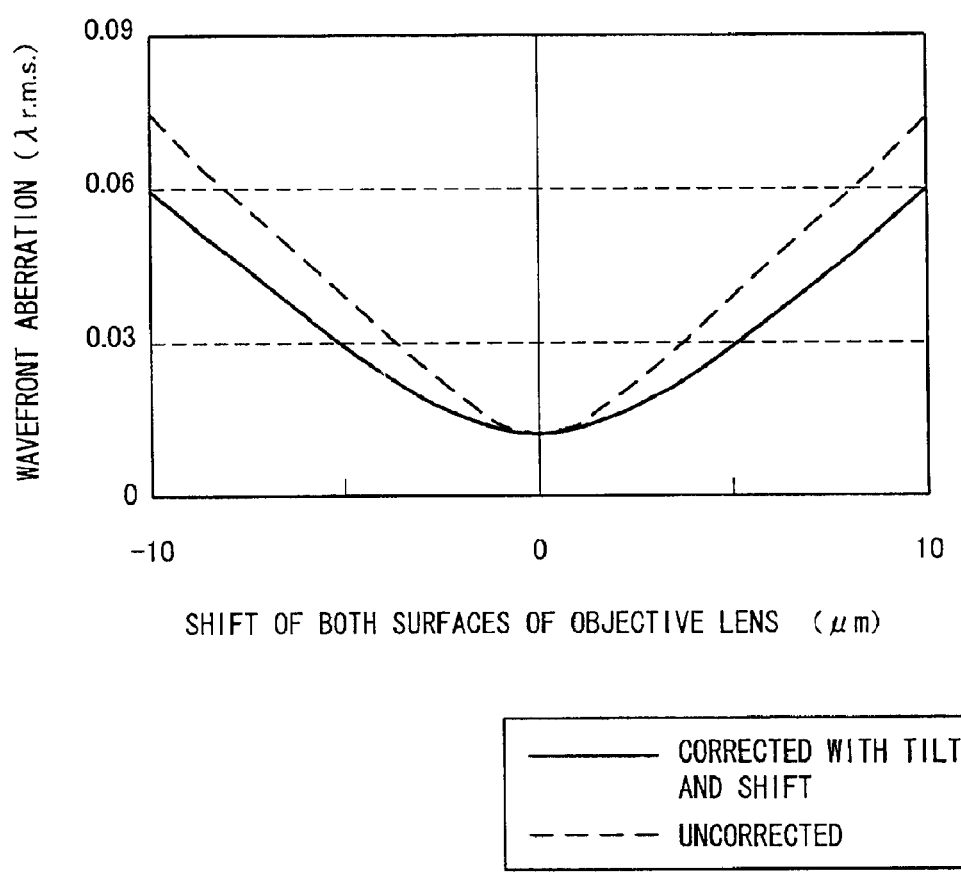
FIG. 24 is a graph showing the relationship between the surface shift error and an aberration characteristic of an objective lens after correction is made using the aberration-correcting optical system in the optical pickup of FIG. 20.

FIG. 24 shows raw and corrected aberrations when the surface shift of the objective lens 71 contains an error within ±10 µm around the design value. The uncorrected aberration does not involve the aberration-correcting optical system 70, and the corrected aberration is obtainable as a result of altering both the tilt and shift of the aberration-correcting lens 72. It is presumed that when the objective lens 71 is molded of glass using a die as in the foregoing, the shifts of both surfaces of the objective lens 71 (lens surface shift errors) vary about ±5 µm due to die sealing and fabrication errors.

According to the graph in FIG. 24, if no aberration-correcting optical system 70 is used (represented by a broken line), the aberration falls within the specified limit of 0.03λ when lens surface shift errors are within ±3.5 µm. It would be therefore understood that precision better than these figures are required in manufacture. Nevertheless, lens surface shift errors less than ±3.5 µm are far from realistic to manufacture when compared to the foregoing manufacturing tolerances of ±5 µm.

In contrast, if correction is made by altering both the tilt and shift of the aberration-correcting lens 72 (represented by a solid line in the graph), lens surface shift errors as large as ±5.5 µm are tolerable. These figures are much more realistic to manufacture than the foregoing manufacturing tolerances ±5 µm.

Alternatively, coma aberrations caused by a surface tilt of the objective lens 71 are correctable by tilting the optical storage medium 10, for example, by tilting the axis of a motor rotating the optical storage medium 10.

Figure 25:
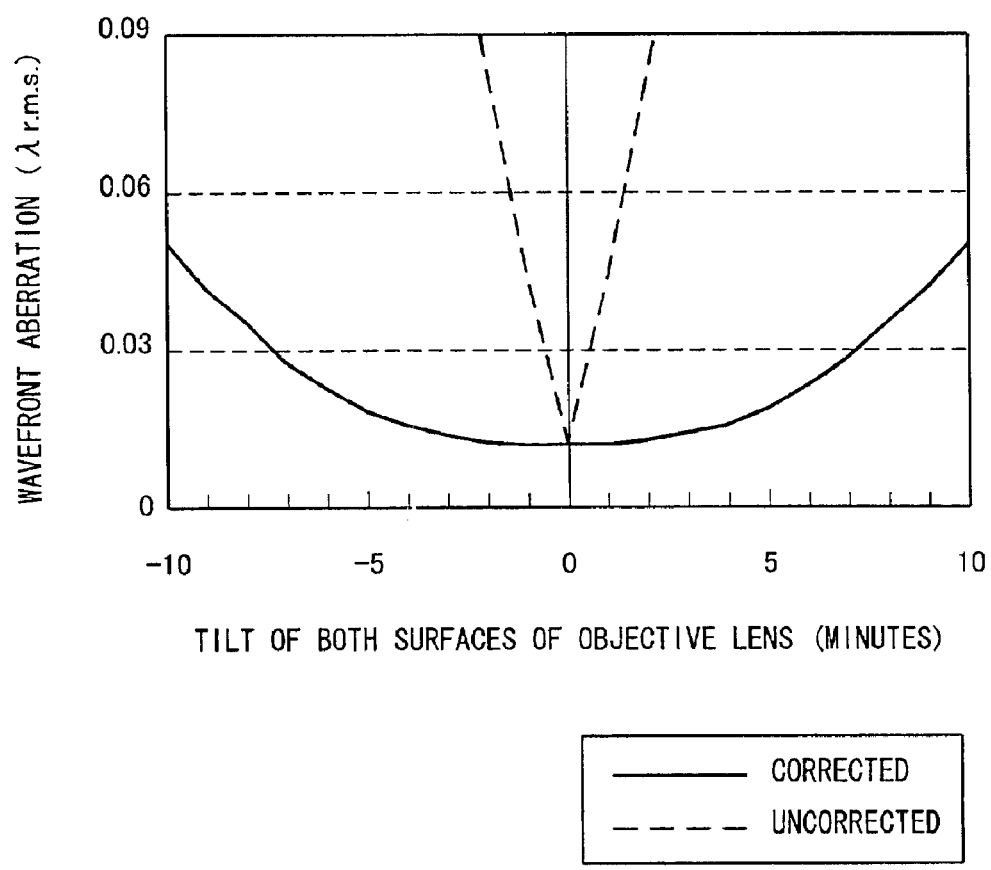
FIG. 25 is a graph showing the relationship between the surface tilt error and a aberration characteristic of an objective lens after correction is made based on the inclination of an optical storage medium in the optical pickup of FIG. 20.

FIG. 25 shows raw and corrected aberrations when the surface tilt of the objective lens 71 contains an error within ±10 minutes around the design value. The uncorrected aberration is obtainable when the optical storage medium is not inclined, and the corrected aberration is obtainable as a result of changing the inclination of the optical storage medium 10. It is presumed that when the objective lens 71 is molded of glass using a die as in the foregoing, the tilts of both surfaces of the objective lens 71 (lens surface tilt errors) vary about ±2 minutes due to die sealing and fabrication errors.

According to the graph in FIG. 25, if the optical storage medium 10 is not inclined (represented by a broken line), the aberration falls within the specified limit of 0.03λ when lens surface tilt errors are within ±0.5 minutes. It would be therefore understood that precision better than these figures are required manufacture. Nevertheless, lens surface tilt errors less than ±0.5 minutes are far from realistic to manufacture when compared to the foregoing manufacturing tolerances of ±2.

In contrast, if correction is made by changing the inclination of the optical storage medium 10 (represented by a solid line in the graph), lens surface tilt errors as large as ±7 minutes are tolerable. These figures are much more realistic to manufacture than the foregoing manufacturing tolerances of ±2 minutes.

As detailed above, the present embodiment achieves a NA as high as 0.85 with a singlet objective lens 71 by means of the inclusion of the aberration-correcting optical system 70 which corrects aberrations of the objective lens 71. The aberration-correcting optical system 70 is adapted to address errors in thickness of the objective lens 71, irregular thicknesses of the transmissive layer 8 of the optical storage medium 10, and multilayer recording, by rendering alterable the distance between the aberration-correcting lens 72 with a negative refraction power and the aberration-correcting hologram lens 73 with a positive refraction power.

Further, the aberration-correcting optical system 70 can correct coma aberrations caused by manufacturing errors of the objective lens 71 by shifting or tilting the aberration-correcting lens 72 or the aberration-correcting hologram lens 73 during assembly.

Further, the aberration-correcting hologram lens 73 can be readily fabricated with a reduced thickness, which opens a way to fabricate the aberration-correcting hologram lens 73 as an integrated part of the objective lens 71, 45° mirror, aperture, PBS, etc. If only the aberration correcting lens 72 is made movable, the optical pickup, and hence a device incorporating the optical pickup, can be further reduced in size.

A major advantage of the present embodiment the greatly reduced color aberrations by means of the provision of a diffraction lens in the aberration-correcting optical system 70. The movement of a best image point due to a variation in wavelength has improved a lot: the movement as measured per every 1 nm change in wavelength has reduced by more than 90%, from about 0.55 µm with the sole use of an objective lens to 0.03 µm with the use of the aberration-correcting hologram lens 73, which is a diffraction lens, in the aberration-correcting optical system 70.

Accordingly, the best image point moves by relatively small amounts along the optical axis, and the beam spot better stays in focus, even with an extended range of wavelength, for example, when the LD as laser emitting means oscillates in multiple mode or due to high frequency convolution. The embodiment thus address problems inherent to high density recording, such as a reduced focus depth and an accompanying need for increased accuracy in focusing the objective lens in the use of a high NA objective lens in the optical pickup: the optical system does not experience aberrations (especially, spherical and color aberrations) that add a further requirement to focusing and delivers a large focus control margin, enabling good data recording/writing.

Figure 26:
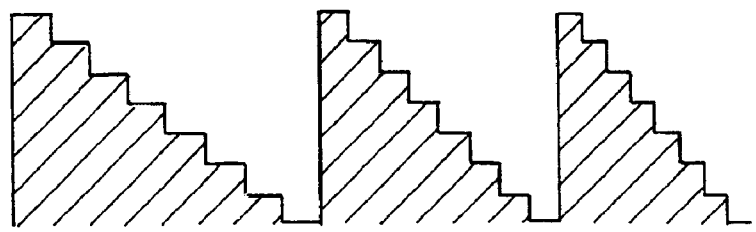
FIG. 26 is an illustration depicting another example of the aberration-correcting hologram lens provided to the aberration-correcting optical system in the optical pickup of FIG. 20.
Figure 27:
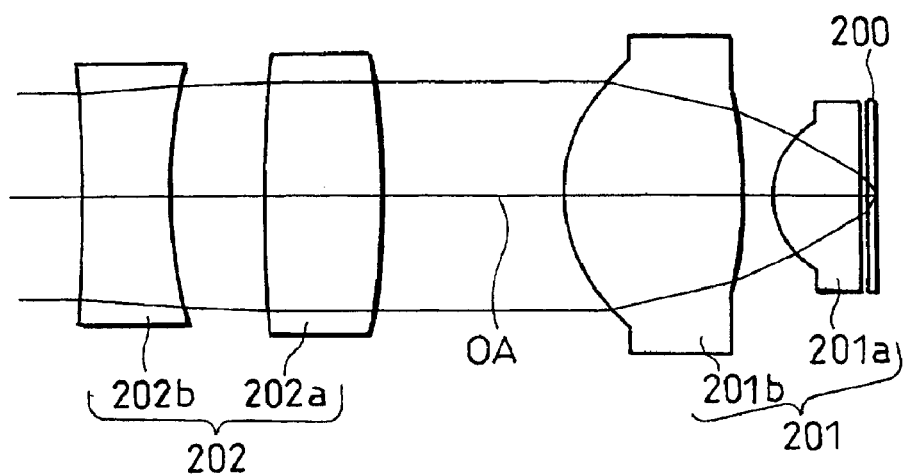
FIG. 27 is a diagram showing an arrangement of an objective lens and an aberration-correcting optical system in a conventional optical pickup.

A blaze-shaped diffraction element shown in FIG. 21 has been used as the aberration-correcting hologram lens in the present embodiment so far; a diffraction element with a binary cross-section as shown in FIG. 26 may be used instead. Theoretically, a 80% or higher diffraction efficiency is available with a diffraction element having four or more levels. The overall diffraction efficiency is little affected even if the element has only two levels in some parts where as many as four levels are difficult to accommodate due to small pitches (those parts that are far from the optical axis of the lens).

A binary diffraction element can be easily fabricated by a manufacturing process based on photolithography and therefore highly compatible with a batch process, which leads to successful production of accurate hologram lenses with high yields. Recent technology has made it possible to fabricate the blaze type by photolithography using electron beam exposure (image formation); both good diffraction efficiency and yields are obtainable. The diffraction element may be rectangular if light abounds, but preferably are of a blaze or binary type in consideration of adverse effects of noise caused by light of unrequited orders.

An optical pickup of the present invention may be such that the aberration-correcting optical system is composed of multiple elements, provided on an optical axis of the output light emitted by a light source, for either converging or diffusing the output light and is mounted so that at least one of the elements is inclinable relative to the optical axis or movable at right angles to the optical axis.

When this is the case, the projection of the output light emitted by a light source onto the objective lens becomes adjustable as at least one of the elements constituting the aberration-correcting optical system is inclined relative to the optical axis or moved at right angles to the optical axis. Coma aberrations can be thus corrected which are due to an inclination or shift of central axes of both surfaces of the objective lens or an inclination of the objective lens to a recording face of an optical storage medium.

An optical pickup of the present invention may be such that one of the elements provided in the aberration-correcting optical system is mounted to be movable in a direction along the optical axis.

When this is the case, the convergence of the output light emitted by a light source onto the objective lens becomes adjustable as at least one of the elements constituting the aberration-correcting optical system is moved in a direction along the optical axis. Spherical aberrations can be thus corrected which are due to an error in distance between the surfaces and in surface accuracy of the objective lens.

An optical pickup of the present invention may be such that the aberration-correcting optical system corrects spherical aberrations by moving one of the elements in the aberration-correcting optical system in a direction along the optical axis, after the aberration-correcting optical system corrects the coma aberrations by inclining the elements relative to the optical axis and moving the elements at right angles to the optical axis.

When this is the case, the aberration-correcting optical system corrects coma aberrations before spherical aberrations.

As a result, installing the optical pickup in an optical reader/writer and other devices only after coma aberrations are corrected, for example, will leave only spherical aberrations to correct when the optical reader/writer and other devices are used; no circuitry or element is required in the device to correct coma aberrations. The device is thus small in size and light in weight.

An optical pickup of the present invention may further include: aberration detecting means for detecting the coma or spherical aberrations based on a return light which is the output light reflected at the optical storage medium; and element drive means for inclining the elements relative to the optical axis and moving the elements at right angles to the optical axis to correct the coma aberrations and also for moving at least one of the elements in a direction along the optical axis to correct the spherical aberrations, all based on a detection result given by the aberration detecting means.

When this is the case, the coma or spherical aberrations are detected, the elements are inclined relative to the optical axis and moved at right angles to the optical axis so as to correct coma aberrations, and one of the elements is moved in a direction along the optical axis so as to correct the spherical aberrations, all based on a detection result given by the aberration detecting means. This makes possible to correct coma and spherical aberrations in real time when the optical pickup is being used in the actual reading/writing of data on the optical storage medium.

Further, an optical pickup of the present invention may be such that the aberration-correcting optical system is composed of elements arranged in two separate groups, one of the two groups having a positive refraction power, the other group having a negative refraction power.

This delivers good properties by correcting aberrations due to a manufacturing error of the objective lens and compensating for effects of variations in thickness of the transmissive layer in the optical storage medium.

An optical pickup of the present invention may further include aberration detecting means and a mobile device so that the distance between the two groups provided in the aberration-correcting optical system is variable based on data given by the aberration detecting means.

This enables multilayer recording and other types of bulk storage reading/writing by correcting aberrations due to a manufacturing error of the objective lens and compensating for effects of variations in thickness of the transmissive layer in the optical storage medium.

An optical pickup of the present invention may be such that the aberration-correcting optical system includes an aspheric lens with at least one surface.

This delivers good properties by correcting aberrations due to a manufacturing error of the objective lens and compensating for effects of variations in thickness of the transmissive layer in the optical storage medium.

An optical pickup of the present invention may be such that the group with a negative refraction power is composed of a single lens made of a material having an Abbe constant of not more than 40.

This delivers a stable servo signal and a reading signal with good characteristics with small movement of the image point even when a different wavelength enters the objective lens.

An optical pickup of the present invention may such that the aberration-correcting optical system includes achromatic doublets as the elements.

When this is the case, a stable servo signal and a reading signal with good characteristics are obtainable with small movement of the image point even when a different wavelength enters the objective lens.

An optical pickup of the present invention may such that the aberration-correcting optical system includes diffraction optical elements as the elements.

When this is the case, a stable servo signal and a reading signal with good characteristics are obtainable with little movement of the image point even when a different wavelength enters the objective lens.

An optical pickup of the present invention may such that the diffraction optical element is of either a blaze- or binary-type hologram.

When this is the case, a stable servo signal and a reading signal with good characteristics are obtainable with little movement of the image point even when a different wavelength enters the objective lens. Good manufacturability and light use efficiency also improve.

An optical pickup of the present invention may such that the objective lens is composed of a single lens.

When this is the case, the objective lens has no resin connecting part as a conventional double group lenses and as a result, delivers high resistance to temperature and humidity changes and time-related changes and high overall reliability. Further, no fabrication is required, which readily allows for increased productivity and reduced cost. A small, lightweight, and highly rigid objective lens becomes available, which enables high density, high speed data reading/writing.

An optical pickup of the present invention may such that the objective lens is a doublet.

When this is the case, color aberrations can be reduced, high resistance to temperature and humidity changes and time-related changes, and high overall reliability become possible. High density, high speed data reading/writing also becomes available.

An optical pickup of the present invention may such that the objective lens includes a material having an index of refraction of not less than 1.75 for a wavelength actually used in the optical pickup.

This allows for a gradually sloped lens surface, which in turn makes it possible to produce objective lenses with large manufacturing tolerances.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An optical pickup for reading/writing data, comprising:
   a convergent optical system, composed of a singlet objective lens having a NA not less than 0.75, for converging output light emitted by a light source on an optical storage medium;
   an aberration-correcting optical system for correcting coma aberrations due to an inclination or shift of central axes of both surfaces of the objective lens or an inclination of the objective lens or the optical storage medium to an optical axis of the optical pickup; and
   wherein the aberration-correcting optical system is composed of multiple elements, provided on an optical axis of the output light, for either converging or diffusing the output light and is mounted so that at least one of the elements is inclinable relative to the optical axis or movable at right angles to the optical axis.

2. The optical pickup as defined in claim 1, wherein
   one of the elements is mounted to be movable in a direction along the optical axis.

3. The optical pickup as defined in claim 2, wherein
   the aberration-correcting optical system corrects spherical aberrations by moving one of the elements in a direction along the optical axis, after the aberration-correcting optical system corrects the coma aberrations by inclining the elements relative to the optical axis and moving the elements at right angles to the optical axis.

4. The optical pickup as defined in claim 3, wherein
the aberration-correcting optical system corrects the coma aberrations by detecting a shape or wavefront aberrations of a focused beam spot produced by the objective lens.

5. The optical pickup as defined in claim 2, further comprising:
aberration detecting means for detecting the coma or spherical aberrations based on a return light which is the output light reflected at the optical storage medium; and element drive means for inclining the elements relative to the optical axis and moving the elements at right angles to the optical axis to correct the coma aberrations and also for moving at least one of the elements in a direction along the optical axis to correct the spherical aberrations, all based on a detection result given by the aberration detecting means.

6. The optical pickup as defined in claim 1, wherein
the aberration-correcting optical system is composed of elements arranged in two separate groups, each group including at least one of the elements for either converging or diffusing the output light.

7. The optical pickup as defined in claim 6, wherein
one of the two groups has a positive refraction power, and the other group has a negative refraction power.

8. The optical pickup as defined in claim 7, wherein
at least one of the two groups is mounted to be movable in a direction along the optical axis.

9. The optical pickup as defined in claim 7, wherein
the group with a positive refraction power is disposed relatively close to the optical storage medium, and the group with a negative refraction power is disposed relatively close to the light source.

10. The optical pickup as defined in claim 7, wherein
the group with a negative refraction power is composed of a single lens made of a material having an Abbe constant of not more than 40.

11. The optical pickup as defined in claim 2, wherein the aberration-correcting optical system includes achromatic doublets as the elements.

12. The optical pickup as defined in claim 2, wherein
the aberration-correcting optical system includes lenses, each having at least one aspheric surface, as the elements.

13. The optical pickup as defined in claim 2, wherein
the aberration-correcting optical system includes wavefront converting means for converting a wavefront as the elements.

14. The optical pickup as defined in claim 13, wherein the wavefront converting means is either a liquid crystal element or a diffraction optical element.

15. The optical pickup as defined in claim 14, wherein the diffraction optical element is of either a blaze type or a binary type.

16. The optical pickup as defined in claim 1, wherein the objective lens is composed of a single lens.

17. The optical pickup as defined in claim 1, wherein the objective lens is a doublet.

18. The optical pickup as defined in claim 1, wherein
the objective lens includes a material having an index of refraction of not less than 1.75 for at least one wavelength actually used in the optical pickup.

19. An optical pickup for reading/writing data, comprising:
a convergent optical system, composed of a singlet objective lens having a NA not less than 0.75, for converging output light emitted by a light source on an optical storage medium;

an aberration-correcting optical system for correcting coma aberrations due to an inclination or shift of central axes of both surfaces of the objective lens or an inclination of the objective lens or the optical storage medium to an optical axis of the optical pickup; and wherein the objective lens includes a material having an index of refraction of not less than 1.75 for at least one wavelength actually used in the optical pickup.

* * * * *